(12) United States Patent
Sakurada

(10) Patent No.: US 8,345,917 B2
(45) Date of Patent: Jan. 1, 2013

(54) IMAGE PROCESSING SYSTEM AND VIEWERSHIP EFFECT MEASURING METHOD

(75) Inventor: Koji Sakurada, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 868 days.

(21) Appl. No.: 12/457,624

(22) Filed: Jun. 17, 2009

(65) Prior Publication Data

US 2010/0027836 A1 Feb. 4, 2010

(30) Foreign Application Priority Data

Aug. 1, 2008 (JP) ................... 2008-199595

(51) Int. Cl.
*G06K 9/00* (2006.01)
*H04N 7/173* (2011.01)
(52) U.S. Cl. ......... 382/100; 725/105; 725/135; 725/143
(58) Field of Classification Search .................. None
See application file for complete search history.

(56) References Cited

U.S. PATENT DOCUMENTS

| | | | |
|---|---|---|---|
| 6,236,395 B1 * | 5/2001 | Sezan et al. | 715/723 |
| 6,301,619 B1 * | 10/2001 | Segman | 709/231 |
| 7,509,580 B2 * | 3/2009 | Sezan et al. | 715/719 |
| 7,712,123 B2 * | 5/2010 | Miyaoku et al. | 725/109 |
| 7,908,172 B2 * | 3/2011 | Corts et al. | 705/14.66 |
| 8,020,183 B2 * | 9/2011 | Ferman et al. | 725/46 |
| 2007/0071329 A1 | 3/2007 | Terakawa | |

FOREIGN PATENT DOCUMENTS

| | | |
|---|---|---|
| JP | 2003-125379 A | 4/2003 |
| JP | 2004-064368 A | 2/2004 |
| JP | 2005-286372 A | 10/2005 |
| JP | 2006-186664 A | 7/2006 |
| JP | 2007-094633 | 4/2007 |
| JP | 3974953 | 6/2007 |
| JP | 2007-202054 A | 8/2007 |
| WO | WO-02/09447 A1 | 1/2002 |

* cited by examiner

*Primary Examiner* — Manav Seth
(74) *Attorney, Agent, or Firm* — Rabin & Berdo, P.C.

(57) ABSTRACT

There is provided an information processing system, comprising: a viewing apparatus equipped with a content reproduction unit that reproduces content containing video data or audio data; a radio communication apparatus equipped with a storage unit in which user data correlated to a user to whom said radio communication apparatus belongs are stored and a data transmitting unit that transmits viewer data that include part of or all of said user data stored in said storage unit; and an information processing apparatus equipped with an analyzing unit that analyzes, based upon the user data, a viewership effect of the content reproduced by said viewing apparatus and a content distribution unit that distributes content data to be used to reproduce the content to said viewing apparatus.

14 Claims, 20 Drawing Sheets

| FACE AREA | FACE ORIENTATION | ATTRIBUTE | |
|---|---|---|---|
| | | INTEREST LEVEL | DEMOGRAPHIC GROUP |
| A | RIGHT 45° /DOWN 45° | 0.5 | M3 |
| B | LEFT 45° /DOWN 45° | 0.5 | F1 |
| C | FRONT | 1 | M1 |
| D | FRONT | 1 | TEENS |

FIG.18

| TIME SLOT | NUMBER OF VIEWERS BY DEMOGRAPHIC GROUP ||||||||| NUMBER OF FOCUSED VIEWERS BY DEMOGRAPHIC GROUP |||||||
|---|---|---|---|---|---|---|---|---|---|---|---|---|---|---|---|
| | M1 | M2 | M3 | F1 | F2 | F3 | KIDS | TEENS | M1 | M2 | M3 | F1 | F2 | F3 | KIDS | TEENS |
| .. | .. | .. | .. | .. | .. | .. | .. | .. | .. | .. | .. | .. | .. | .. | .. | .. |
| 11-12 | 1 | 0 | 1 | 1 | 0 | 0 | 0 | 1 | 1 | 0 | 0 | 0 | 0 | 0 | 0 | 1 |
| .. | .. | .. | .. | .. | .. | .. | .. | .. | .. | .. | .. | .. | .. | .. | .. | .. |

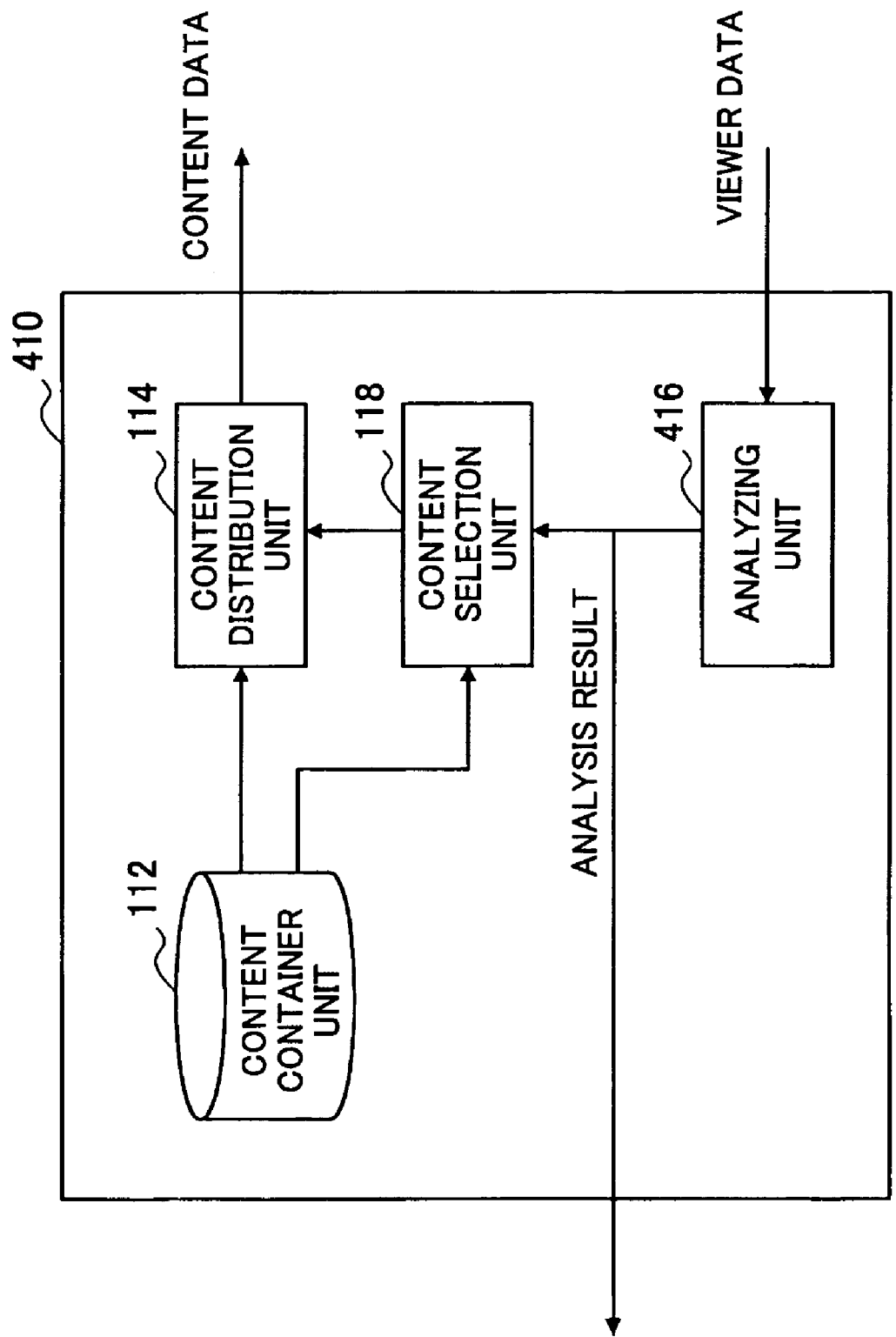

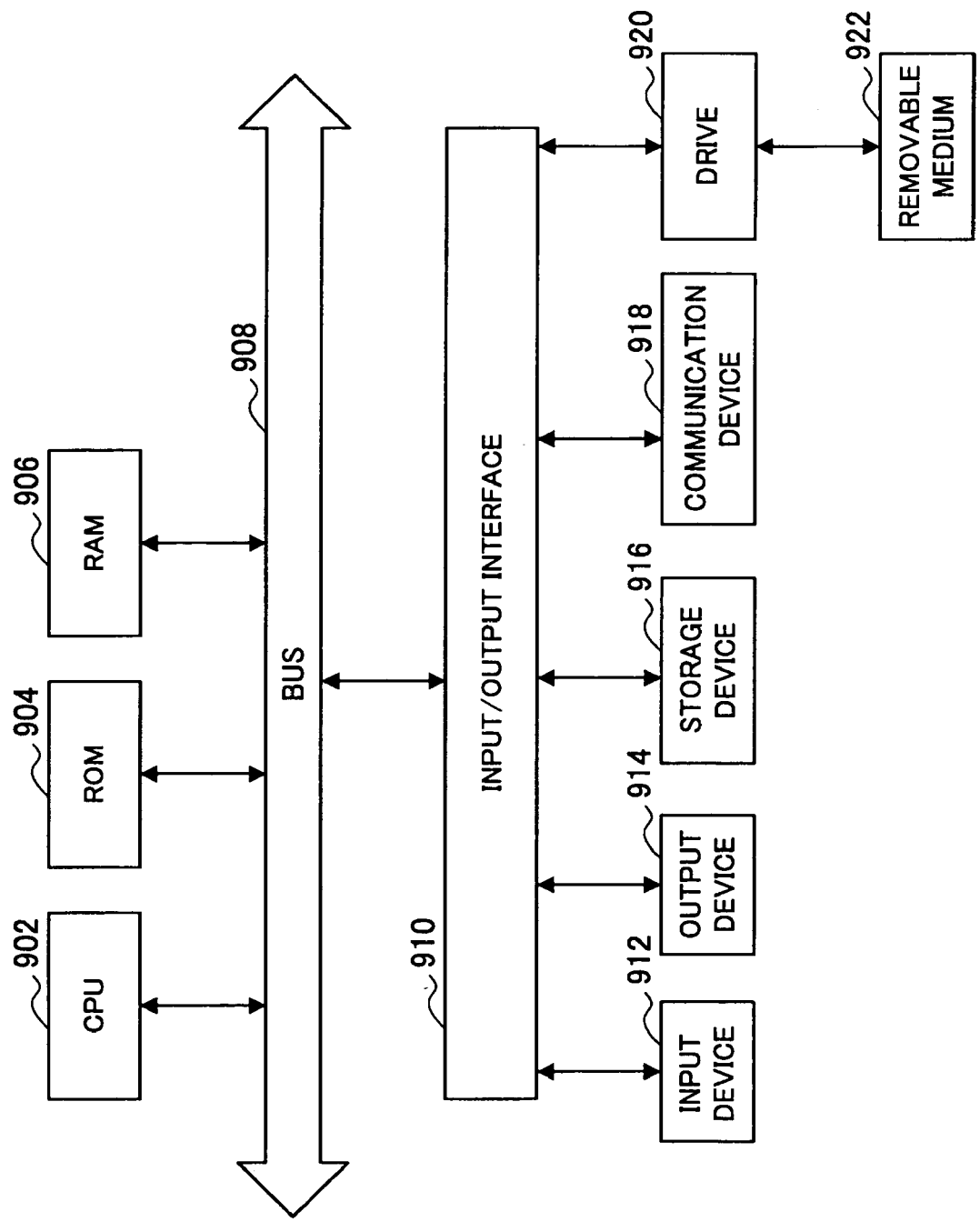

IMAGE PROCESSING SYSTEM AND VIEWERSHIP EFFECT MEASURING METHOD

BACKGROUND OF THE INVENTION

1. Field of the Invention

The present invention relates to an information processing system and a viewership effect measuring method.

2. Description of the Related Art

Ratings measured by a ratings measuring apparatus are widely used as an index indicating the promotion effect of a television program or as an index indicating the level of viewer interest in a matter presented in a broadcast program. A standard ratings measuring apparatus detects a channel that is tuned-in from the antenna line of the receiver onto which the television signal corresponding to the tuned-in channel leaks and transmits information related to the detected tuned-in channel to a center via a communication network.

There are also systems adopted in practical applications whereby tuned-in channels are detected as described above and also ratings information corresponding to various viewer demographic groups is collected by allowing viewers watching television to manually indicate their attributes. The ratings information collected in correspondence to the individual viewer demographic groups, enabling accurate analysis of the viewing tendency of each viewer demographic group, proves to be a useful tool for television programming and for formulating effective advertising targeting strategies. However, such a system requires the viewers themselves to indicate their individual attributes and thus imposes an operational onus on the viewers. There is an added issue in that accurate information may not always be collected through such a system.

These challenges are addressed in Japanese Patent Publication No. 3974953 disclosing a technology whereby a dictionary containing preregistered images is referenced to match an image obtained by capturing a image of a current viewer in order to collect attribute information indicating the attributes of the particular viewer without requiring any viewer operation.

SUMMARY OF THE INVENTION

However, while the technology disclosed in Japanese Patent Publication No. 3974953 may be highly effective in determining the viewer profiles in a household with specific household members constituting likely viewers, there are certain circumstances, e.g., an unspecified number of random viewers watching a large-screen television in a public place, under which the viewers cannot be identified with ease and thus the technology does not work effectively.

In views of the above issues discussed above, an object of the present invention is to provide a new and improved information processing system and a new and improved viewership effect measuring method, with which the viewership effect can be measured accurately by collecting information indicating the attributes of an unspecified number of viewers.

The object described above is achieved in an aspect of the present invention by providing an information processing system comprising a viewing apparatus equipped with a content reproduction unit that reproduces content containing video data or audio data, a radio communication apparatus equipped with a storage unit in which user data correlated to a user to whom the radio communication apparatus belongs are stored and a data transmitting unit that transmits viewer data that include part of or all of the user data stored in the storage unit, and an information processing apparatus equipped with an analyzing unit that analyzes, based upon the user data, a viewership effect of the content reproduced by the viewing apparatus and a content distribution unit that distributes to the viewing apparatus content data to be used to reproduce the content.

In the information processing system described above, the content data needed when reproducing the content containing video data or audio data are distributed to the viewing apparatus from the content distribution unit of the information processing apparatus and the content reproduction unit of the viewing apparatus is thus able to reproduce the content. In addition, the user data correlated to the viewer of the reproduced content are stored in the storage unit of the radio communication apparatus belonging to the viewer, and viewer data that include part of or all of the user data are transmitted from the data transmitting unit of the radio communication apparatus. Upon receiving the viewer data, the analyzing unit at the information processing apparatus analyzes the viewership effect of the content reproduced by the viewing apparatus based upon the received viewer data.

The viewing apparatus may be further equipped with a driver unit that prompts the radio communication apparatus to transmit the viewer data by transmitting a query signal containing a content identifier to be used to identify the content, the radio communication apparatus may be further equipped with a radio communication unit that receives the query signal from the viewing apparatus, and the data transmitting unit may transmit the viewer data that include the content identifier contained in the query signal received at the radio communication unit and part of or all of the user data stored in the storage unit.

The data transmitting unit may temporarily store the content identifier contained in the query signal received at the radio communication unit into a recording medium and transmit the viewer data that include the saved content identifier and part of or all of the user data stored in the storage unit after a request signal requesting transmission of the viewer data is input thereto.

The driver unit may obtain a content identifier included in the content data distributed from the content distribution unit of the information processing apparatus and generate the query signal, which contains the content identifier.

The query signal may include information that specifies at least one of; a content reproduction time point, a reproduction location, content details, a response condition indicating an apparatus to respond to the query signal and a type of data to be included in a response to the query signal.

Provided that the query signal includes information specifying a response condition indicating an apparatus to respond to the query signal, the data transmitting unit may transmit the viewer data only if the radio communication apparatus satisfies the response condition.

The data transmitting unit may continually transmit the viewer data over regular cycles.

The viewer data may include a user identifier used to identify the user, the information processing apparatus may be further equipped with a user data container unit that holds attribute data corresponding to each user in relation to the user identifier, and the analyzing unit may extract the user identifier from the viewer data and analyze the viewership effect of the content by obtaining from the user data container unit the attribute data correlated to the extracted user identifier.

The viewer data may include a user identifier used to identify the user, the viewing apparatus may be further equipped with an imaging unit that captures an image of a viewer of the content reproduced by the content reproduction unit, the information processing apparatus may be further equipped with a face image container unit that holds face image data corresponding to each user in relation to the user identifier, and the analyzing unit may extract the user identifier from the viewer data and analyze the viewership effect of the content based upon the viewer data only if a face image correlated to the extracted user identifier has a match in the image captured by the imaging unit.

The viewing apparatus may be further equipped with an imaging unit that captures an image of a viewer of the content reproduced by the content reproduction unit, and the analyzing unit may analyze the viewership effect of the content in reference to an interest level index indicating a person's level of interest in the content, determined based upon the direction of the person's face in the image captured by the imaging unit.

The viewing apparatus may be further equipped with an imaging unit that captures an image of a viewer of the content reproduced by the content reproduction unit, and the analyzing unit may analyze the viewership effect of the content in reference to attribute data indicating a gender and/or an age group of a person in the image captured by the imaging unit, determined based upon the captured image.

The information processing apparatus may be further equipped with a face image data container unit that holds face image data corresponding to each user in relation to the attribute data, and the analyzing unit may analyze the viewership effect of the content in reference to the attribute data of a person identified by matching a face area of the person in the image captured by the imaging unit with face image data held in the face image data container unit.

The information processing apparatus may be further equipped with a content selection unit that selects content to be distributed via the content distribution unit in correspondence to results of viewership effect analysis executed by the analyzing unit.

The object described above is further achieved in another aspect of the present invention by providing a viewership effect measuring method comprising steps of: distributing content data to be used to reproduce content containing video or audio data to a viewing apparatus from an information processing apparatus, receiving and reproducing the content data at the viewing apparatus, transmitting viewer data that includes part of or all of user data correlated to a viewer of the reproduced content from a radio communication apparatus belonging to the viewer and receiving the viewer data at the information processing apparatus and analyzing a viewership effect of the content reproduced by the viewing apparatus based upon the viewer data having been received.

As described above, the information processing system and the viewership effect measuring method according to the present invention enable measurement of the viewership effect based upon viewer attributes indicated in attribute information collected from an unspecified number of viewers.

BRIEF DESCRIPTION OF THE DRAWINGS

FIG. 18 illustrates an example of viewer data that may be tabulated in the fourth embodiment;

FIG. 19 is a block diagram showing the structure of the information processing apparatus according to the fourth embodiment; and FIG. 20 is a block diagram presenting a structural example that may be adopted in an general-purpose computer.

DETAILED DESCRIPTION OF THE PREFERRED EMBODIMENTS

Figure 1:
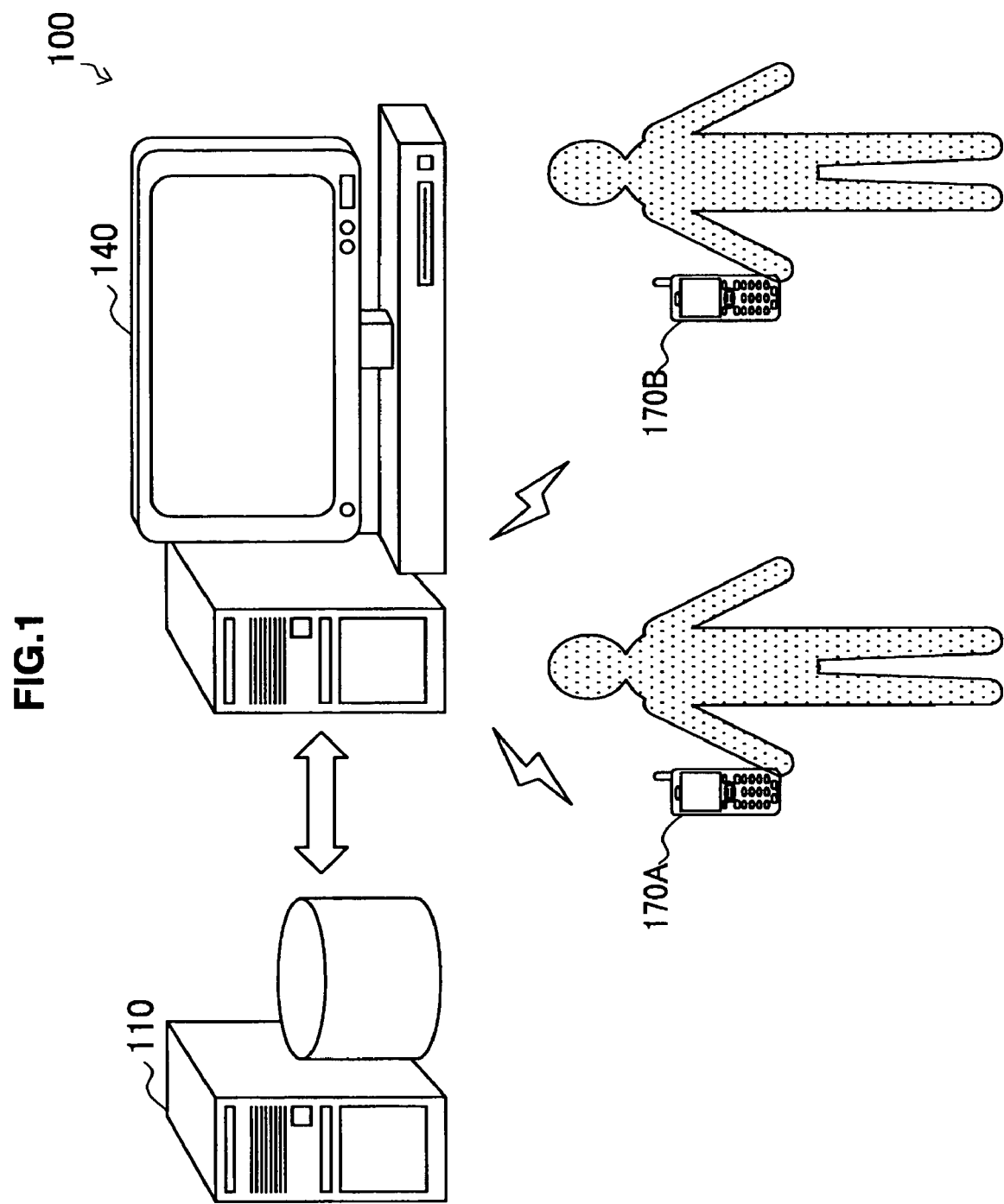
FIG. 1 schematically illustrates the configuration of the information processing system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(1) First Embodiment

First, in reference to FIG. 1, an information processing system 100 according to the first embodiment of the present invention is outlined.

FIG. 1 schematically illustrates the configuration of the information processing system 100 according to the first embodiment of the present invention. As FIG. 1 shows, the information processing system 100 includes an information processing apparatus 110, a viewing apparatus 140 and radio communication apparatuses 170.

The information processing apparatus 110 is typically constituted with an general-purpose computer. The information processing apparatus 110 distributes content data containing video data or audio data to, for instance, to the viewing apparatus 140. In addition, the information processing apparatus 110 receives viewer data to be described in further detail later from the viewing apparatus 140 and selects content to be distributed to the viewing apparatus 140 based upon results obtained by analyzing the viewer data.

The information processing apparatus 110 and the viewing apparatus 140 are connected with each other via any communication network. The communication network connecting the information processing apparatus 110 and the viewing apparatus 140 may be, for instance, the Internet, a LAN (local area network), a WAN (wide area network), a dedicated line or a VPN (virtual private network).

The viewing apparatus 140 is typically constituted with a terminal apparatus equipped with a display device. The viewing apparatus 140 receives content data distributed from, for instance, the information processing apparatus 110 and reproduces the content on the display device. The viewing apparatus 140 may include a display device constituted with a large-screen television installed in a public space and, in such a case, any number of random viewers may view content reproduced by the viewing apparatus 140.

The viewing apparatus 140 and a radio communication apparatus 170 are connected with each other via any radio communication network. The radio communication network connecting the viewing apparatus 140 and the radio communication apparatus 170 may enable radio communication through a wireless LAN in compliance with, for instance, the IEEE 802.11a, b, g or n standard through the Bluetooth® in compliance with the IEEE 802.15.1 standard, based upon a portable telephone communication protocol in compliance with the IMT (international mobile telephone communication) 2000 standard or the like.

The radio communication apparatus 170 is typically constituted with a communication terminal equipped with a radio communication function. The radio communication apparatus 170, in which user data correlated to the user who owns the radio communication apparatus are stored, transmits part of or all of the user data with specific timing by engaging the radio communication function thereof. The recording medium in which the user data are stored does not need to be an integrated part of the radio communication apparatus 170. Namely, the recording medium in which the user data are stored may be, for instance, an IC card or an RF ID (radio frequency identification) tag loaded in the radio communication apparatus 170 whenever necessary.

While FIG. 1 shows a single viewing apparatus 140, the embodiment allows a plurality of viewing apparatuses 140 to communicate with a single information processing apparatus 110. In addition, while FIG. 1 shows two radio communication apparatuses, i.e., the radio communication apparatus 170A and the radio communication apparatus 170, any number of radio communication apparatuses 170 may be used in conjunction with a single viewing apparatus 140 in the embodiment.

Next, in reference to FIGS. 2 through 5, the logical structures adopted in the information processing apparatus 110, the viewing apparatus 140 and the radio communication apparatuses 170 in the embodiment are described in detail.

Figure 2:
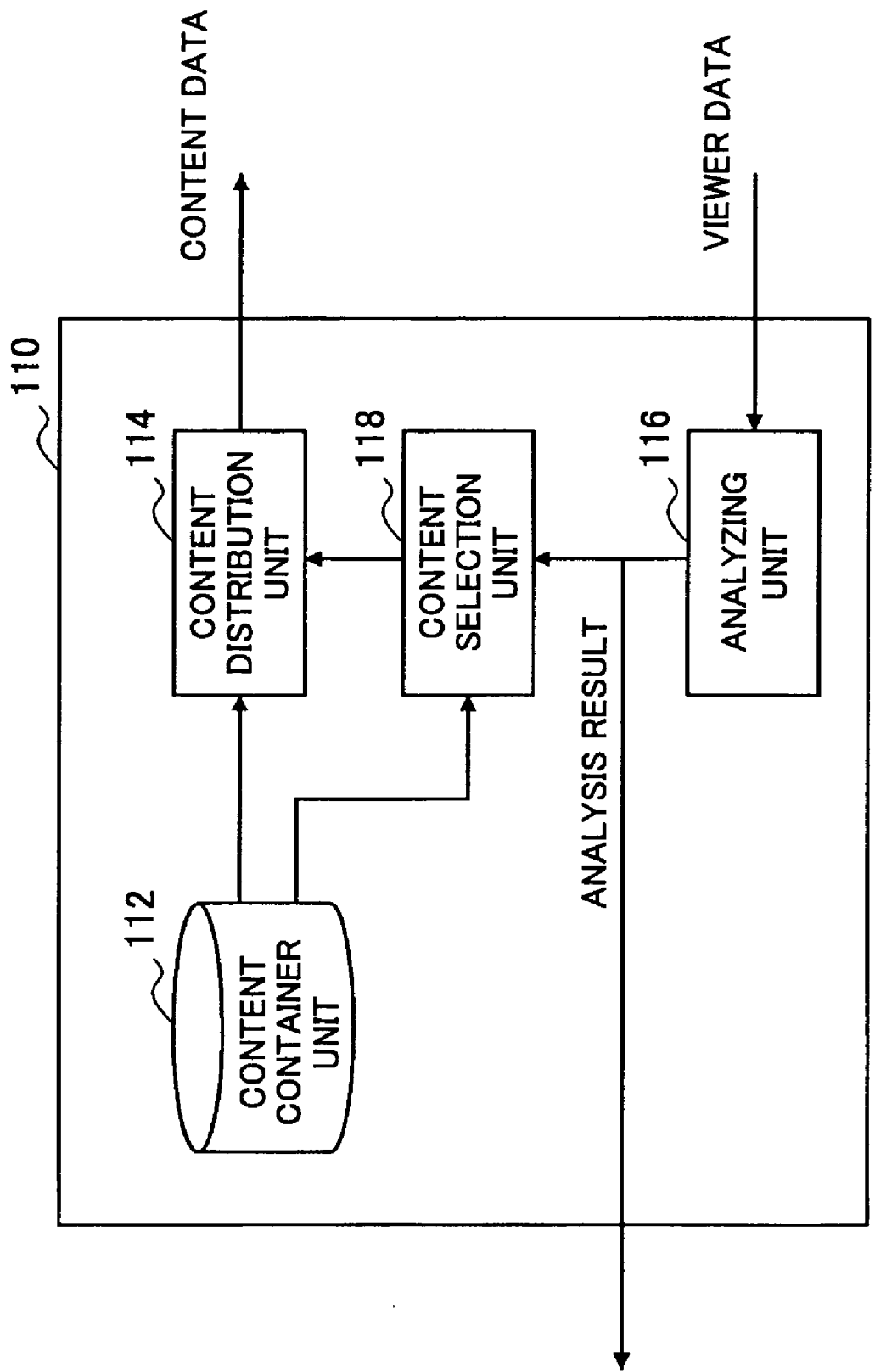
FIG. 2 is a block diagram showing the structure of the information processing apparatus according to the first embodiment.

FIG. 2 is a block diagram showing the logical structure of the information processing apparatus 110 according to the embodiment. As shown in FIG. 2, the information processing apparatus 110 includes a content container unit 112, a content distribution unit 114, an analyzing unit 116 and a content selection unit 118.

In the content container unit 112, typically constituted with a storage device such as a hard disk drive or a flash memory, content data containing content to be distributed from the information processing apparatus 110, characteristics data indicating the characteristics of the content and the like are held.

The content distribution unit 114 obtains the content data held in the content container unit 112, divides, for instance, video data in the content data into a plurality of video packets and then distributes the video packets to the viewing apparatus 140 via the communication network. During an initial stage following an operation start, content to be distributed by the content distribution unit 114 is sequentially selected in conformance to a preset distribution schedule. Then, when a specific length of time elapses following the operation start, content to be distributed by the content distribution unit 114 is selected by the content selection unit 118 based upon the results of the viewership effect analysis, as explained later.

The analyzing unit 116 receives the viewer data from the viewing apparatus 140 or the radio communication apparatus 170 and analyzes the viewership effect of content reproduced by the viewing apparatus 140 based upon the received viewer data. The viewer data used by the analyzing unit 116 to analyze the viewership effect include a content identifier used to identify the particular content, attributes indicating the viewer's gender, age group and the like, the content reproduction time point or the content viewing time point and the like. Based upon such viewer data, the analyzing unit 117 calculates the number of viewers corresponding to each content identifier, the number of viewers corresponding to a specific attribute or a specific viewing time point and the like and outputs analysis results obtained through the calculation to the content selection unit 118 and an external system (not shown).

Based upon the viewership effect analysis results output from the analyzing unit 116, the content selection unit 118 selects content to be distributed by the content distribution unit 114 and outputs a selection instruction signal. For instance, if the viewership effect analysis results indicate higher ratings among young female viewers, the content selection unit 118 may select a greater number of sets of content judged to target the young female demographic group based upon the characteristics data held in the content container unit 112.

The external system, having received the viewership analysis results output from the analyzing unit 116, is able to allocate an optimal advertising budget or work out an effective advertising strategy based upon the analysis results.

Figure 3:
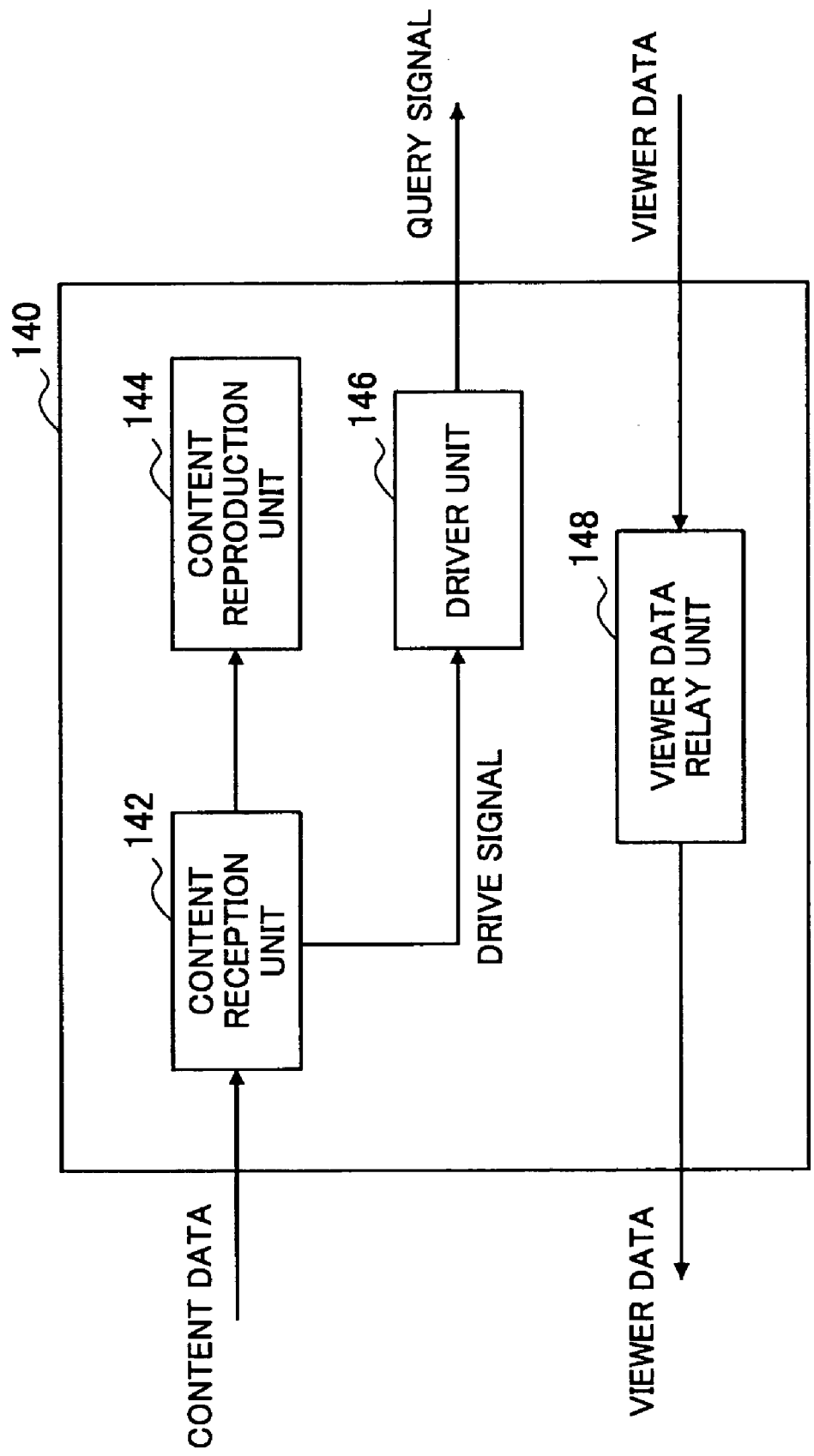
FIG. 3 is a block diagram showing the structure of the viewing apparatus according to the first embodiment.

FIG. 3 is a block diagram showing the logical structure adopted in the viewing apparatus 140 in the embodiment. As shown in FIG. 3, the viewing apparatus 140 includes a content reception unit 142, a content reproduction unit 144, a driver unit 146 and a viewer data relay unit 148.

The content reception unit 142 receives content data distributed via, for instance, the content distribution unit 114 at the information processing apparatus 110, so as to enable the content reproduction unit 144 to reproduce the content. In addition, the content reception unit 142 detects a content switch point in the content data and outputs a drive signal to the driver unit 146. For instance, the content reception unit 142 may detect a point at which the content identifier included in the content data distributed via the content distribution unit 114, switches at the content switch point.

The content reproduction unit 144 reproduces content on the display device at the viewing apparatus 140 by demodulating and decoding the content data input from the content reception unit 142. The content reproduced by the content reproduction unit 144 is viewed by the viewer owning or carrying, for instance, a radio communication apparatus 170 shown in FIG. 1.

In response to the drive signal input thereto from the content reception unit 142, the driver unit 146 wirelessly outputs a query signal prompting an apparatus present near the viewing apparatus to provide viewer data over specific cycles (e.g., every 15 seconds). It is assumed that the query signal output from the driver unit 146 in the embodiment contains information indicating the content identifier and the content reproduction time point included in the drive signal.

The viewer data relay unit 148 receives viewer data transmitted from the radio communication apparatus 170 in response to the drive signal received thereat and passes the received viewer data on to the information processing apparatus 110. In addition, when relaying viewer data, the viewer data relay unit 148 may tabulate the number of viewers in correspondence to a specific identifier, a specific viewer attribute or a specific viewing time point, and transmit the tabulated viewer data to the information processing apparatus 110.

Figure 4:
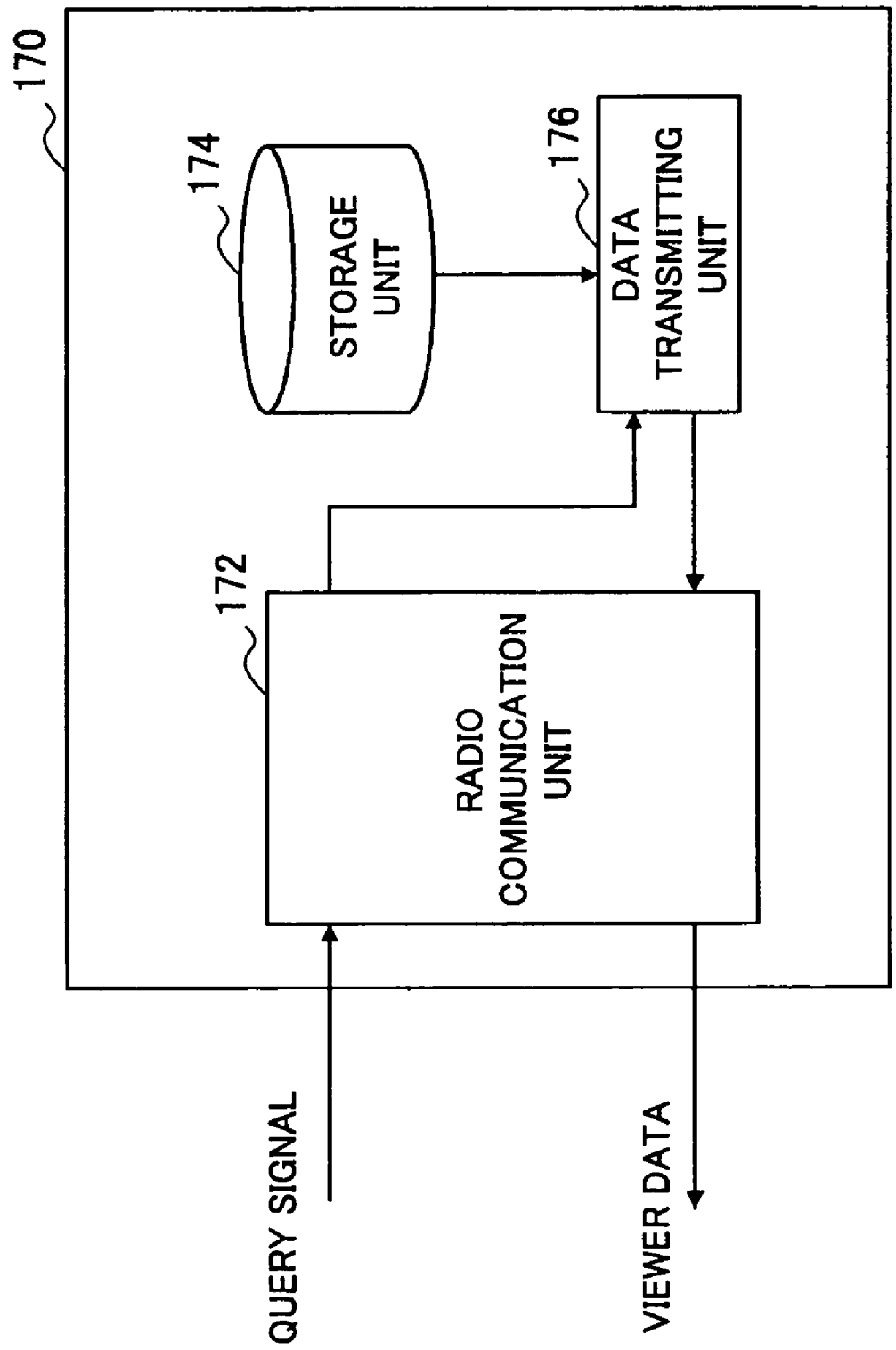
FIG. 4 is a block diagram showing the structure of the radio communication apparatus according to the first embodiment.

FIG. 4 is a block diagram showing the logical structure adopted in the radio communication apparatus 170 in the embodiment. As shown in FIG. 4, the radio communication apparatus 170 includes a radio communication unit 172, a storage unit 174 and a data transmitting unit 176.

The radio communication unit 172 is a communication interface that enables the radio communication apparatus 170 to engage in radio communication with an apparatus present nearby. The query signal mentioned earlier, transmitted from, for instance, the driver unit 146 of the viewing apparatus 140, is received at the radio communication unit 172, which then demodulates/decodes the received signal. In addition, the radio communication unit 172 encodes/modulates viewer data transmitted from the data transmitting unit 176 to be detailed later and then transmits the viewer data to the viewing apparatus 140 or the information processing apparatus 110.

In the storage unit 174, which may be constituted with a storage device such as a hard disk drive or a flash memory, or an IC card or an RF ID tag loaded into the radio communication apparatus 170 as needed, user data correlated to the user of the radio communication apparatus are stored. The user data stored in the storage unit 174 include a user identifier used to identify the particular user and attribute data indicating the gender, age and preferences of the user. Part of or all of the user data is obtained by the data transmitting unit 176 having detected the query signal transmitted from the driver unit 146 of the viewing apparatus 140.

As the query signal is received at the radio communication unit 172, the data transmitting unit 176 obtains part of or all of the user data from the storage unit 174 and engages the radio communication unit 172 to transmit viewer data constituted with the extracted user data to the viewing apparatus 140 or the information processing apparatus 110. The data transmitting unit 172 may also incorporate the content identifier or the content reproduction time point (i.e., the viewing time point) in the received query signal into the viewer data being transmitted.

Figure 5:
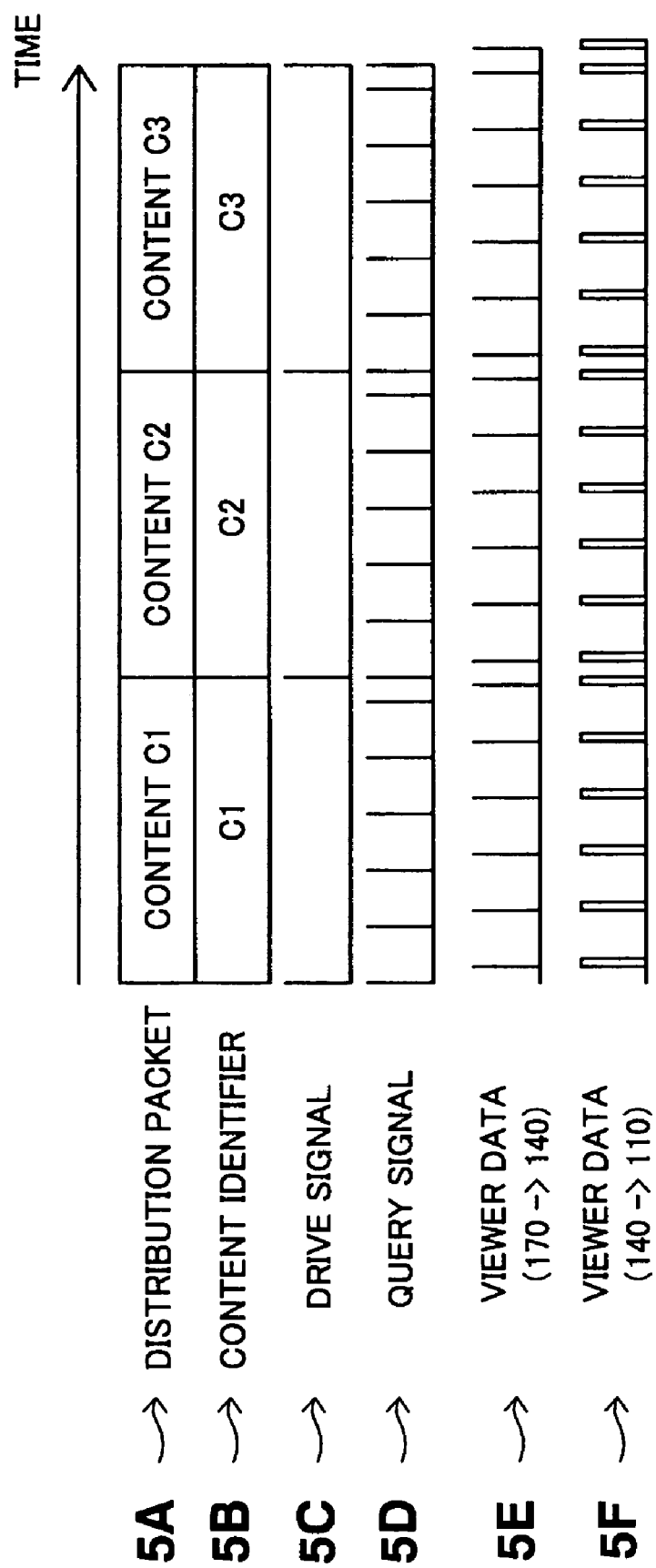
FIG. 5 presents an example of timing with which signals may be exchanged in the first embodiment.

FIG. 5 illustrates timing with which signals or information transmitted/received within the information processing system 100 in the present embodiment may be exchanged.

FIG. 5 indicates that content C1, content C2 and content C3 are distributed in this order along the time axis from the information processing apparatus 110 to the viewing apparatus 140 (5A). In addition, the individual sets of content data distributed from the information processing apparatus 110 to the viewing apparatus 140 respectively contain content identifiers "C1", "C2" and "C3" (5B).

At the viewing apparatus 140 receiving the individual sets of content data, a drive signal is output each time the content reception unit 142 detects a time point at which a given content identifier changes to another content identifier (5C). In addition, in response to the drive signal input thereto, the driver unit 146 wirelessly transmits a query signal cyclically (5D).

Upon receiving the query signal from the driver unit 146, the radio communication apparatus 170 transmits viewer data constituted with part of or all of the user data stored in the radio communication apparatus as a response to the query signal (5E).

The viewing apparatus 140 having received the viewer data from, for instance, the two radio communication apparatuses 170A and 170B then tabulates the viewer data at the viewer data relay unit 148 and transmits the tabulated viewer data to the information processing apparatus 110 (5F).

In the first embodiment of the present invention described above in reference to FIGS. 1 through 5, viewer data originating from radio communication apparatuses 170 carried by viewers are collected in response to the query signal transmitted from the viewing apparatus 140 synchronously with the content reproduction/viewing timing. As a result, the attributes of viewers viewing the content can be determined, making it possible to accurately measure the viewership effect even at a location where any number of viewers may view the content.

It is to be noted that in the example presented in FIG. 2, the information processing apparatus 110 analyzes the viewership effect by using the attribute data included in the viewer data transmitted from radio communication apparatuses 170. As an alternative, attribute data correlated to user identifiers may be held in the information processing apparatus 110 and the viewership effect may be analyzed based upon the attribute data held at the information processing apparatus 110.

Figure 6:
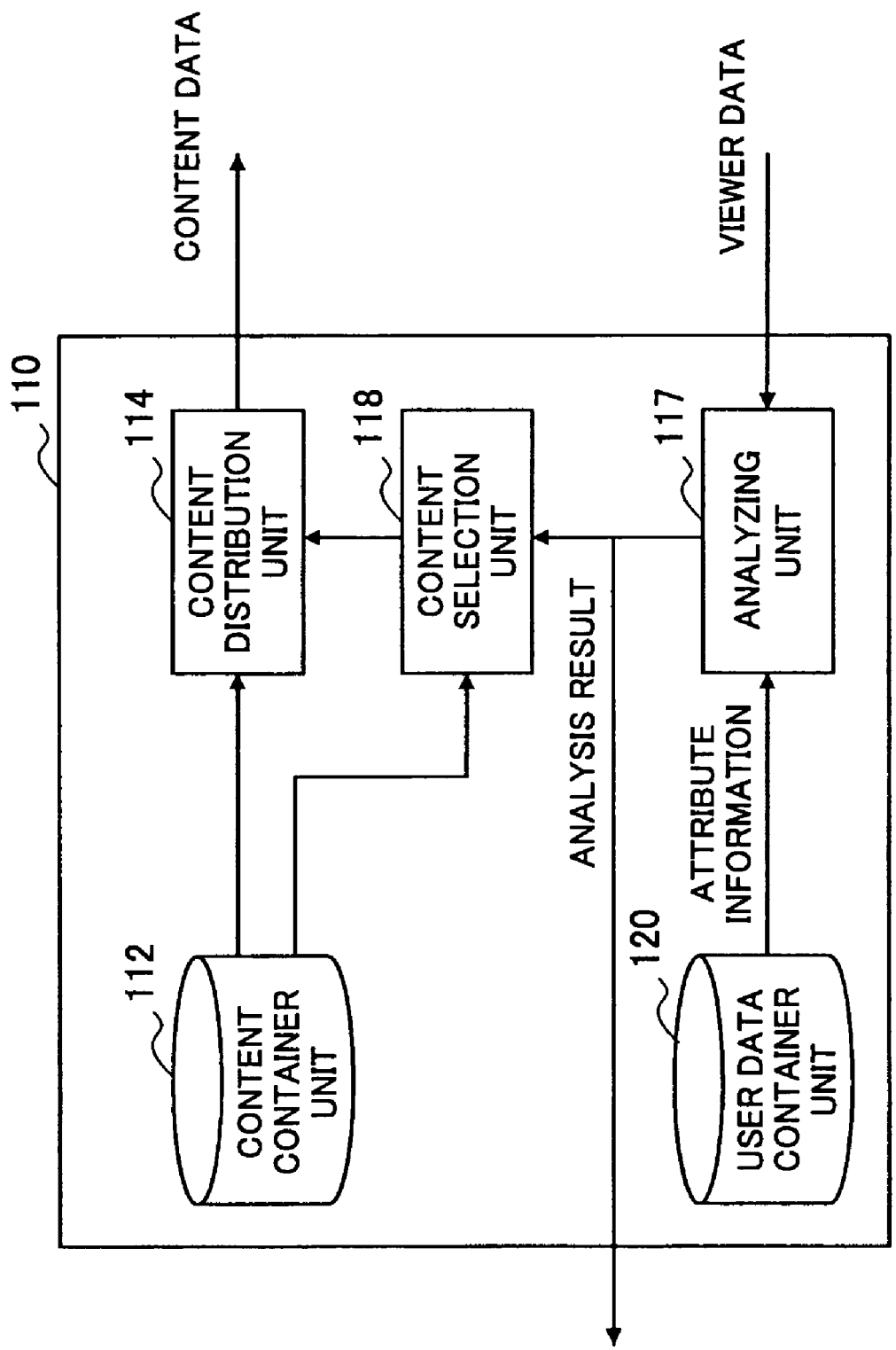
FIG. 6 is a block diagram showing the structure adopted in the information processing apparatus in a variation of the first embodiment.

FIG. 6 is a block diagram showing the logical structure adopted in the information processing apparatus 110 achieve as a variation of the embodiment. As shown in FIG. 6, the information processing apparatus 110 includes a content container unit 112, a content distribution unit 114, an analyzing unit 117, a content selection unit 118 and a user data container unit 120.

The user data container unit 120 in the variation holds therein attribute data of users participating in the viewership effect measurement executed in the information processing system 100, in relation to user identifiers. The attribute data held in the user data container unit 120 may include data indicating, for instance, the gender, the age, the preferences and the like of each user. Such attribute data are output from the user data container unit 120 in response to a request issued by the analyzing unit 117 upon receiving viewer data.

The viewer data transmitted from a given radio communication apparatus 170 in the variation are simply made up with the user identifier in the user data for the content viewer and do not include any attribute data, since the analyzing unit 117 having received the viewer data is able to extract the user identifier in the viewer data and then obtain the attribute data correlated to the user identifier from the user data container unit 120. The analyzing unit 117 subsequently analyzes the viewership effect of the content by using the attribute data obtained from the user data container unit 120 and outputs the analysis results to the content selection unit 118 and the external system (not shown).

In the variation of the embodiment described in reference to FIG. 6, the user attribute data are not exchanged via a communication network and, as a result, the risk of information leak occurring as the information is collected for purposes of viewership effect analysis is reduced.

It is to be noted that while the embodiment has been described by assuming that the content identifiers are included in the content data distributed by the content distribution unit 114, the content identifiers may instead be transmitted from the information processing apparatus 110 to the viewing apparatus 140 through another communication channel.

In addition, the query signal transmitted by the driver unit 146 of the viewing apparatus 140 to the radio communication apparatus 170 does not need to include the content identifier. In other words, the data transmitting unit 176 at the radio communication apparatus 170 having received the query signal may transmit viewer data that include the user identifier stored in the radio communication apparatus and the viewing time point. Then, the analyzing unit 116 of the information processing apparatus 110 having received such viewer data will be able to ascertain the specific content viewed by the user by matching up the viewing time point included in the viewer data with the distribution schedule set for the content held at the information processing apparatus 110.

In addition, the radio communication apparatus 170 does not need to wait for a query signal from the viewing apparatus 140 and may transmit the viewer data with timing that is not regulated by the query signal. For instance, the data transmitting unit 176 at the radio communication apparatus 170 may cyclically transmit viewer data indicating the user identifier identifying the user of the radio communication apparatus and the current time point, to enable measurement of the viewership effect at a location where specific content may be viewed by any number of viewers.

(2) Second Embodiment

Next, in reference to FIGS. 7~10, the second embodiment of the present invention is described.

Figure 7:
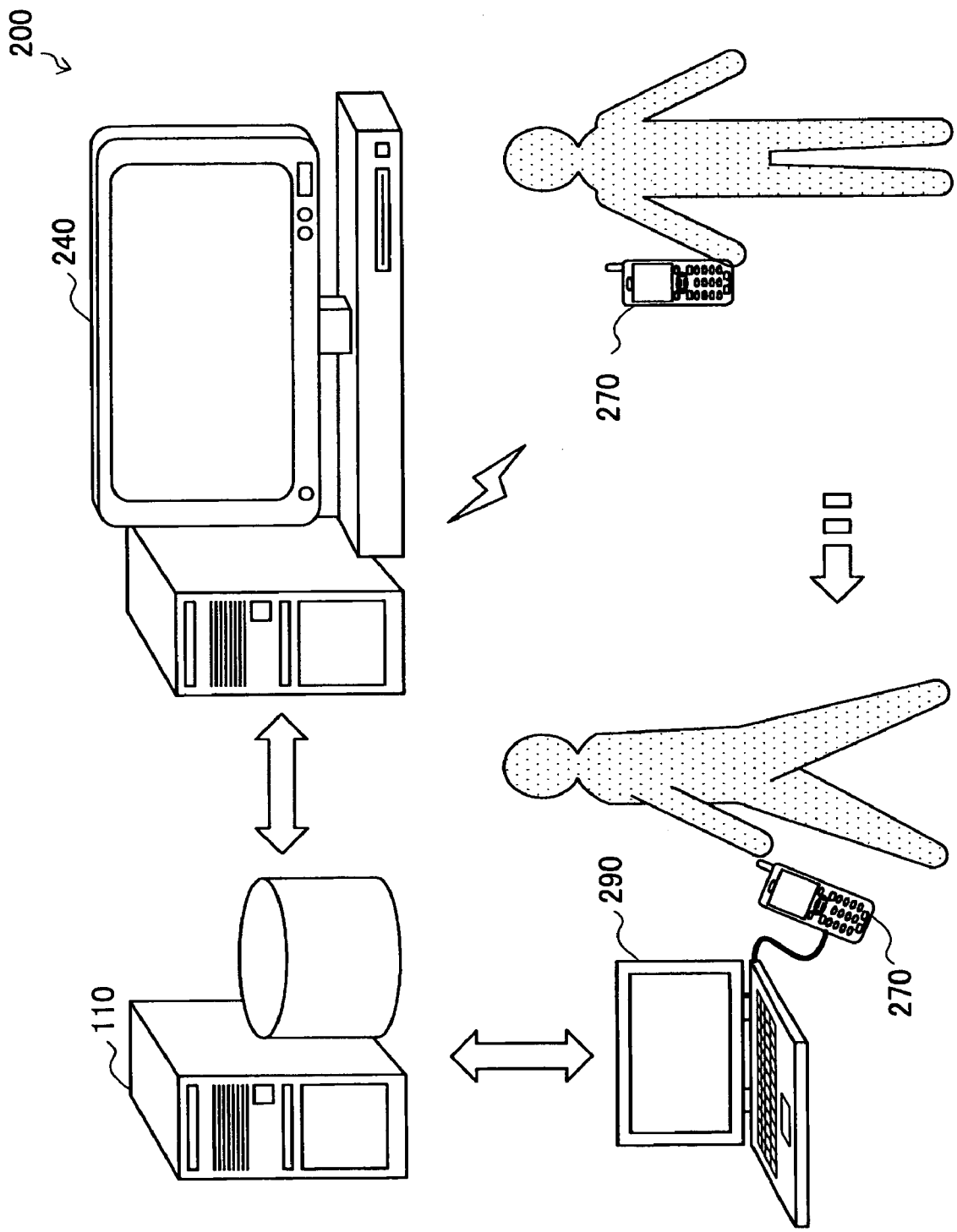
FIG. 7 schematically illustrates the configuration of the information processing system according to a second embodiment.

FIG. 7 schematically illustrates the configuration of an information processing system 200 according to the second embodiment of the present invention. The information processing system 200 in FIG. 7 includes an information processing apparatus 110, a viewing apparatus 240, a radio communication apparatus 270 and a communication apparatus 290.

Content reproduced on the display device at the viewing apparatus 240 is viewed by the user of the radio communication apparatus 270. As in the first embodiment, the viewing apparatus 240 may include a display device constituted with a large-screen television installed in a public space and, in such a case, any number of random viewers may view content reproduced by the viewing apparatus 240.

In the embodiment, the viewer data are transmitted to the information processing apparatus 110 via the communication apparatus 290 connected to the radio communication apparatus 270 after the content is viewed, instead of being transmitted from the radio communication apparatus 270 at the time of content viewing.

The radio communication apparatus 270 and the communication apparatus 290 can be connected through wired communication in compliance with standard specifications such as the USB (universal serial bus) or the IEEE 1394, or through wireless communication in compliance with standard specifications such as the NFC (near field communication). In addition, the communication apparatus 290 and the information processing apparatus 110 are connected with each other through any type of communication network such as the Internet, a LAN, a WAN, a dedicated line or a VPN.

While FIG. 7 shows a single viewing apparatus 240, the embodiment may be adopted in conjunction with a plurality of viewing apparatuses 240. In addition, any number of radio communication apparatuses 270 may be used in conjunction with a given viewing apparatus 240.

Figure 8:
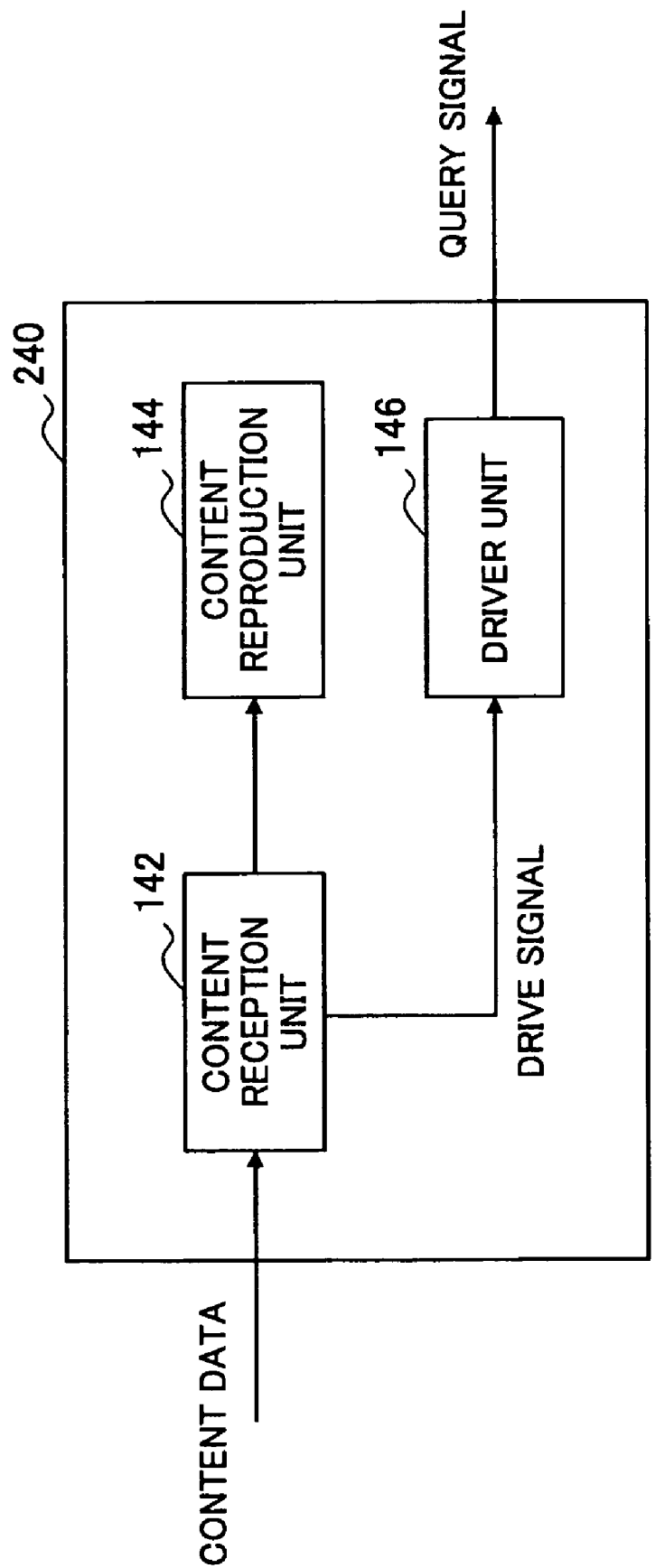
FIG. 8 is a block diagram showing the structure of the viewing apparatus according to the second embodiment.

FIG. 8 is a block diagram showing the logical structure adopted in the viewing apparatus 240 in the embodiment. As FIG. 8 shows, the viewing apparatus 240 includes a content reception unit 142, a content reproduction unit 144 and a driver unit 146. The viewing apparatus 240 in the embodiment shown in FIG. 8 is structurally identical to the viewing apparatus 140 in the first embodiment having been described in reference to FIG. 3, except that the viewing apparatus 240 does not include a viewer data relay unit 148.

Figure 9:
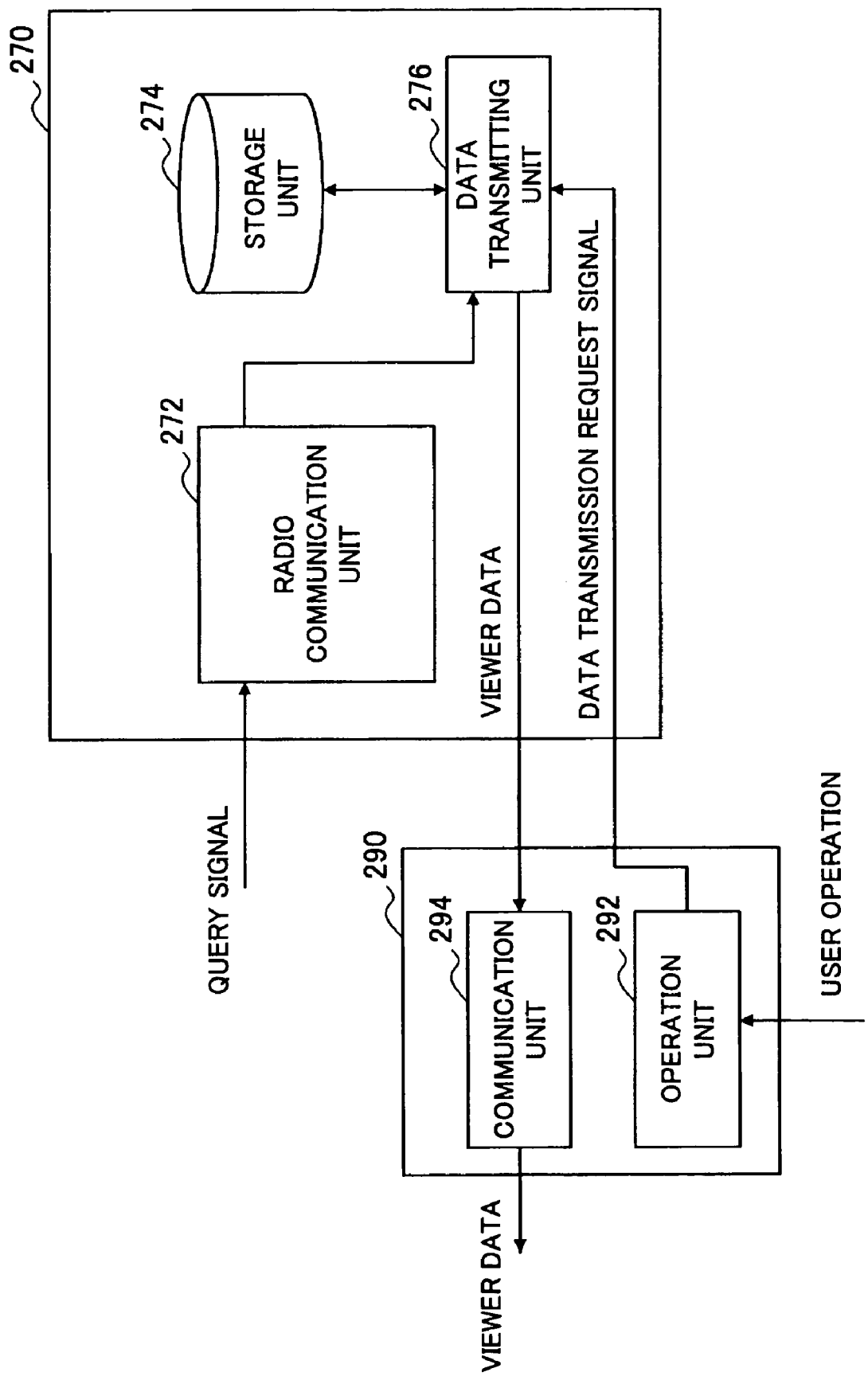
FIG. 9 is a block diagram showing the structures of the radio communication apparatus and the communication apparatus according to the second embodiment.

FIG. 9 is a block diagram showing the logical structures adopted in the radio communication apparatus 270 and the communication apparatus 290 in the embodiment. As shown in FIG. 9, the radio communication apparatus 270 includes a radio communication unit 272, a storage unit 274 and a data transmitting unit 276. The communication apparatus 290 includes an operation unit 292 and a communication unit 294.

The radio communication unit 272 is a communication interface that enables the radio communication apparatus 270 to engage in radio communication with an apparatus present nearby. The query signal mentioned earlier, transmitted from, for instance, the driver unit 146 of the viewing apparatus 240, is received at the radio communication unit 272, which then demodulates/decodes the received signal, as in the first embodiment.

In the storage unit 274, which may be constituted with a storage device such as a hard disk drive or a flash memory, or an IC card or an RF ID tag loaded into the radio communication apparatus 170 as needed, user data correlated to the user of the radio communication apparatus are stored, as in the first embodiment. In addition, the content identifier and the like included in viewer data to be transmitted to the information processing apparatus 110 from the data transmitting unit 276 to be detailed later are temporarily stored in the storage unit 274.

As the query signal is received at the radio communication unit 272, the data transmitting unit 276 temporarily stores the content identifier, the content reproduction time point and the like in the query signal into the storage unit 274. Then, as a request signal requesting viewer data transmission is input thereto, the data transmitting unit 276 transmits viewer data that include the content identifier saved in the storage unit 274 and part of or all of the user data stored in the storage unit 274 to the information processing apparatus 110 via the communication unit 294 at the communication apparatus 290.

The request signal, requesting that the data transmitting unit 276 transmit the viewer data, may be input to the data transmitting unit 276 from the operation unit 292 of the communication apparatus 290 connected to the radio communication apparatus 270 after the content is viewed.

The operation unit 292 at the communication apparatus 290 takes in an instruction or information entered by the user via an input device such as a button, a switch, a lever, a mouse or a keyboard and generates an input signal such as the request signal requesting data transmission mentioned earlier.

The communication unit 294 of the communication apparatus 290 is a communication interface that enables the communication apparatus 290 to engage in wired communication or wireless communication with the information processing apparatus 110. The communication unit 294 relays the viewer data being transmitted from the data transmitting unit 276 of the radio communication apparatus 270 to the information processing apparatus 110.

Figure 10:
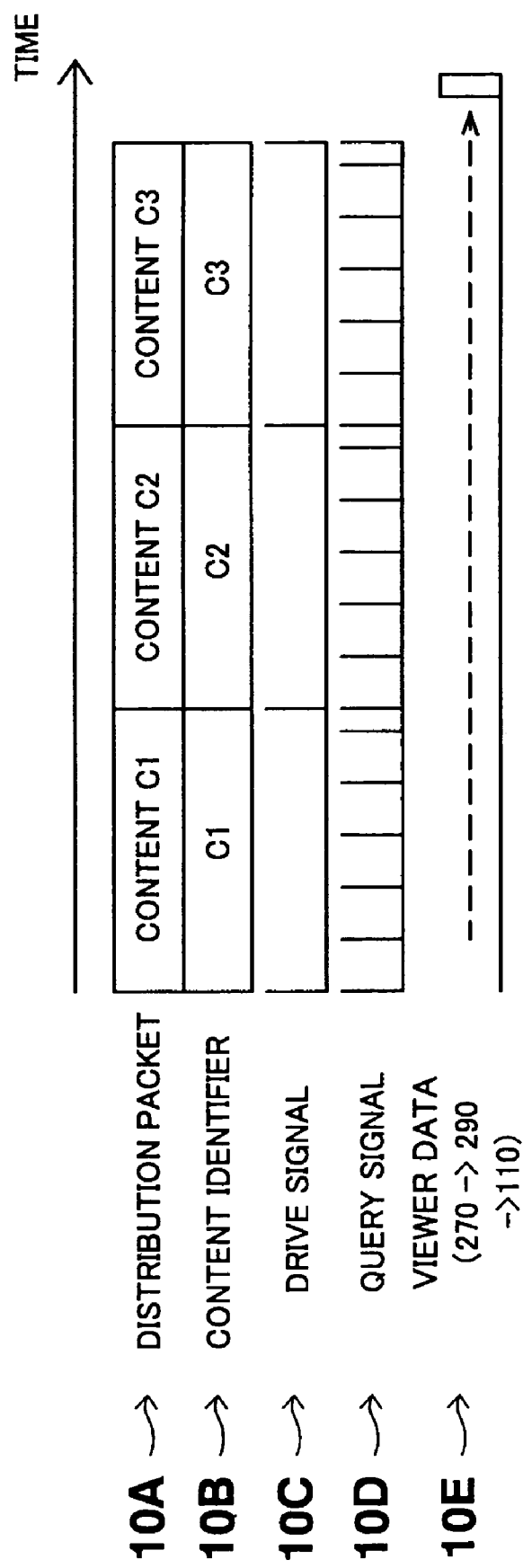
FIG. 10 presents an example of timing with which signals may be exchanged in the second embodiment.

FIG. 10 illustrates timing with which signals or information transmitted/received within the information processing system 200 in the embodiment may be exchanged.

FIG. 10 indicates that content C1, content C2 and content C3 are distributed in this order along the time axis from the information processing apparatus 110 to the viewing apparatus 240 (10A). In addition, the individual sets of content data distributed from the information processing apparatus 110 to the viewing apparatus 140 respectively contain content identifiers "C1", "C2" and "C3" (10B).

At the viewing apparatus 240 receiving the individual sets of content data, a drive signal is output each time the content reception unit 142 detects a time point at which a given content identifier changes to another content identifier (10C). In addition, in response to the drive signal input thereto, the driver unit 146 wirelessly transmits a query signal cyclically (10D).

The radio communication apparatus 270 having received the query signal output from the driver unit 146 temporarily stores the content identifier, the content reproduction time point and the like indicated in the query signal into the storage unit 274. Then, as the user having viewed the content connects the radio communication apparatus 270 to the communication apparatus 290 installed in his home or the like and performs a specific operation to issue a request for viewer data transmission, the viewer data are transmitted from the radio communication apparatus 270 to the information processing apparatus 110 (10E).

Subsequently, the viewer data having been transmitted from the radio communication apparatus 270 to the information processing apparatus 110 are analyzed by the analyzing unit 116 at the information processing apparatus 110 as in the first embodiment, and the analysis results are used when selecting content, allocating an optimal advertising budget or working out an optimal advertising strategy.

In the second embodiment of the present invention having been described above in reference to FIGS. 7~10, information related to content having been viewed is stored into the radio communication apparatus 270 carried by the viewer in response to the query signal transmitted from the viewing apparatus 240 synchronously with the content reproduction/viewing timing. Then, in response to an operation performed by the viewer, viewer data that includes the content-information having been accumulated in the radio communication apparatus 270 and the user data are collected. The embodiment enables measurement of the viewership effect even at a location where any number of viewers may be expected to view the content and also assures a high level of viewer privacy protection that reflects the individual viewer's preferences.

(3) Third Embodiment

Next, in reference to FIGS. 11~14, the third embodiment of the present invention is described.

Figure 11:
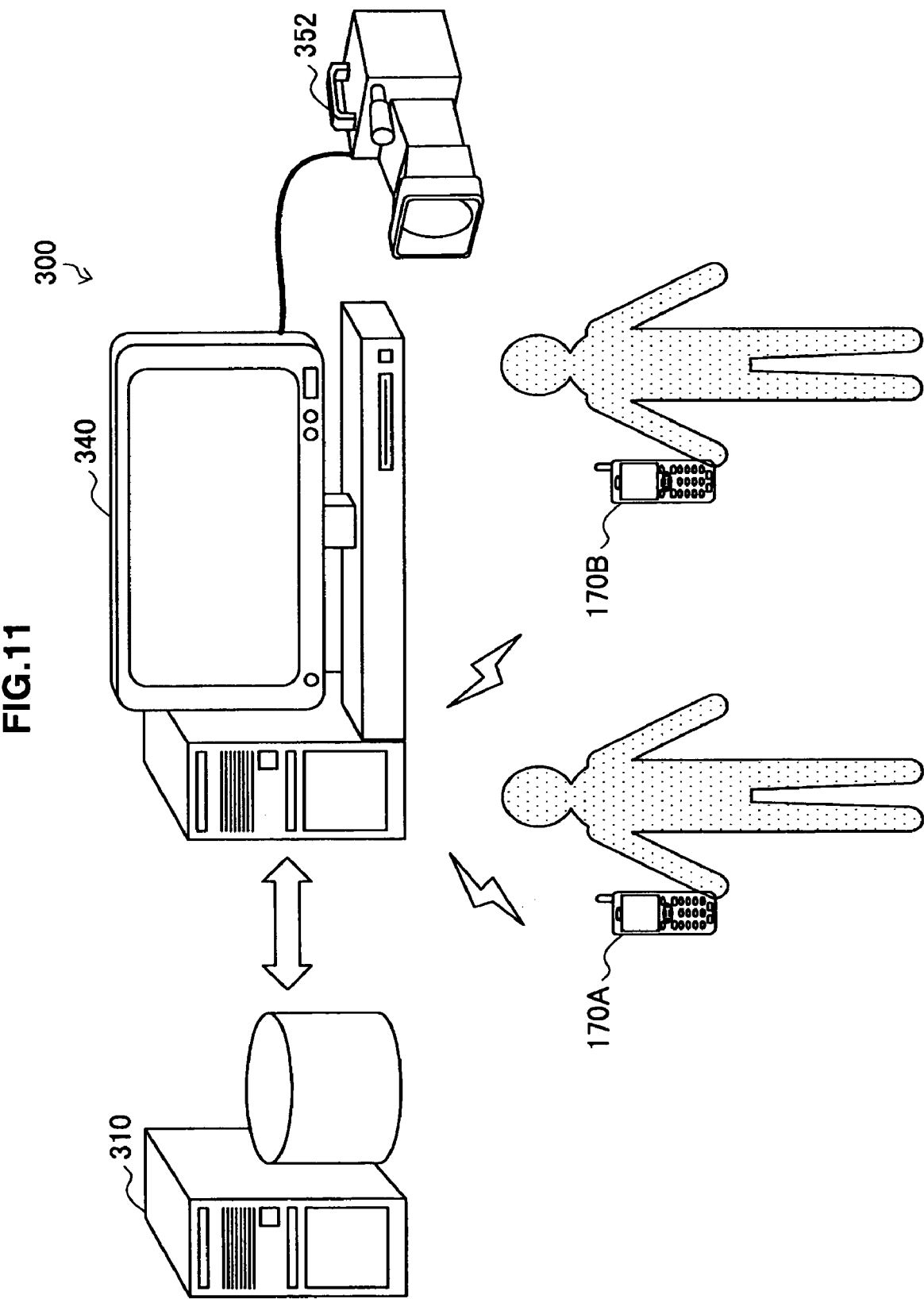
FIG. 11 schematically illustrates the configuration of the information processing system according to a third embodiment.

FIG. 11 schematically illustrates the configuration of an information processing system 300 according to the third embodiment of the present invention. The information processing system 300 in FIG. 11 includes an information processing apparatus 310, a viewing apparatus 340 and radio communication apparatuses 170. The viewing apparatus 340 is equipped with an additional unit, i.e., an imaging unit 352.

While FIG. 11 shows a single viewing apparatus 340, the embodiment may be adopted in conjunction with a plurality of viewing apparatuses 340. In addition, any number of radio communication apparatuses 170 may be used in conjunction with a given viewing apparatus 340.

Figure 12:
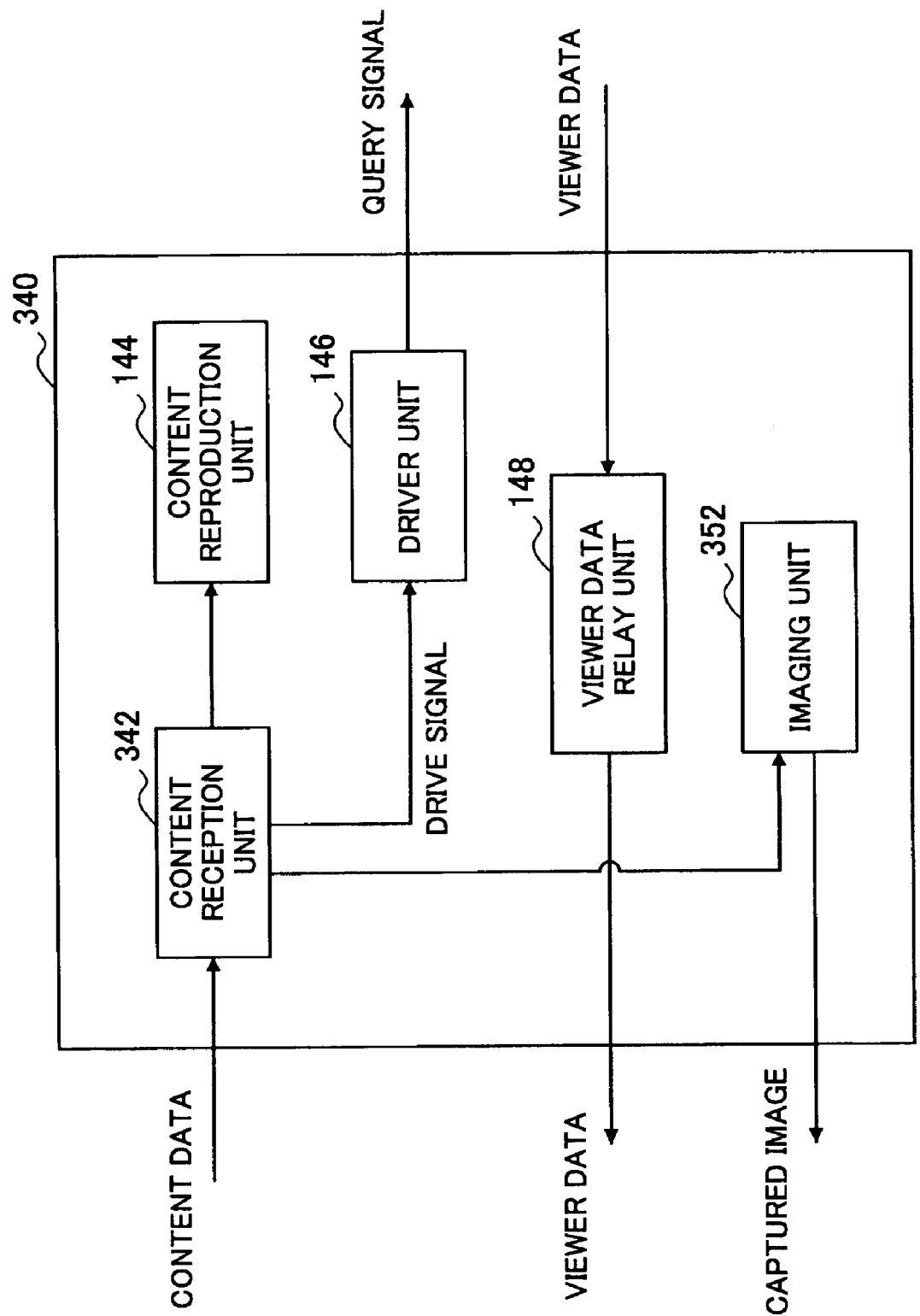
FIG. 12 is a block diagram showing the structure of the viewing apparatus according to the third embodiment.

FIG. 12 is a block diagram showing the logical structure adopted in the viewing apparatus 340 in the embodiment. As shown in FIG. 12, the viewing apparatus 340 includes a content reception unit 342, a content reproduction unit 144, a driver unit 146, a viewer data relay unit 148 and the imaging unit 352.

The content reception unit 342 receives content data distributed via, for instance, the content distribution unit 114 at the information processing apparatus 310, so as to enable the content reproduction unit 144 to reproduce the content. In addition, the content reception unit 342 outputs a drive signal to the driver unit 146 and the imaging unit 352 as the content identifier included in the content data changes.

The imaging unit 352 captures an image of the viewer with an imaging device disposed near the display device at which the content is reproduced and directed to viewers and transmits the image having been captured (hereafter referred to as the captured image) to the information processing apparatus 310. The imaging operation may be executed continually by the imaging unit 352 while the content is reproduced via the content reproduction unit 144 over cycles matching the query signal output cycle with which the query signal is output from the driver unit 146.

Figure 13:
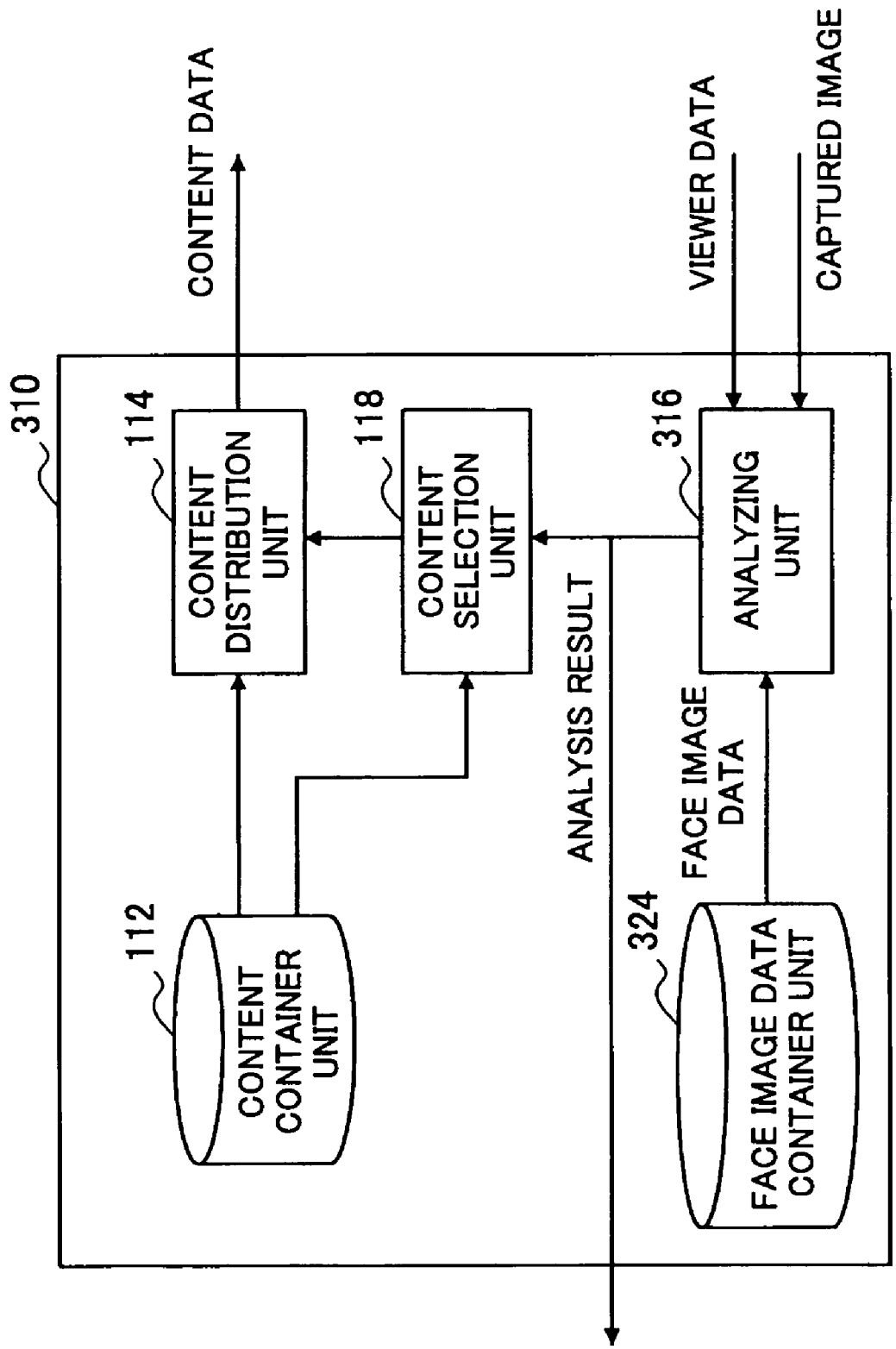
FIG. 13 is a block diagram showing the structure of the information processing apparatus according to the third embodiment.

FIG. 13 is a block diagram showing the logical structure of the information processing apparatus 310 according to the embodiment. As shown in FIG. 13, the information processing apparatus 310 includes a content container unit 112, a content distribution unit 114, an analyzing unit 316, a content selection unit 118 and a face image data container unit 324.

The face image data container unit 324 in the present embodiment holds face image data of users participating in the viewer effect measurement executed in the information processing system 300 in correspondence to individual user identifiers. Such face image data are output from the face image data container unit 324 in response to a request issued from the analyzing unit 316 having received viewer data. In addition, attribute data indicating, for instance, the gender, age, personal preferences and the like of each user are held in relation to the user identifier of users in the face image data container unit 324.

Upon receiving viewer data from the viewing device 140 or a radio communication apparatus 170, the analyzing unit 316 extracts the user identifier included in the viewer data. In addition, the analyzing unit 316 obtains from the face image data container unit 324 the face image data correlated to the extracted user identifier. Then, upon receiving the captured image described earlier from the imaging unit 352 of the viewing apparatus 340, the analyzing unit 316 matches the received captured image with the face image correlated to the user identifier and makes a decision as to whether or not the captured image contains the viewer's face image. The matching processing may be executed by combining a method of cutting out a partial image corresponding to a person's face in the image and a method of matching images, both of the known art.

If it is decided based upon the results of the matching processing executed by the analyzing unit 316 that the captured image received from the imaging unit 352 contains a face image matching the face image correlated to the user identifier included in the viewer data, the analyzing unit 316 obtains the attribute data of the user correlated to the user identifier. Based upon the attribute data and the content identifiers and the viewing time points indicated in the viewer data, the analyzing unit 117 calculates the number of viewers corresponding to each content identifier, the number of viewers corresponding to a specific attribute or a specific viewing time and the like and outputs analysis results obtained through the calculation.

If the results of the matching processing executed by the analyzing unit 316 indicate that the captured image received from the imaging unit 352 does not contain a face image matching the face image correlated to the user identifier included in the viewer data, the analyzing unit 316 does not use the received viewer data for the viewership effect analysis.

Figure 14:
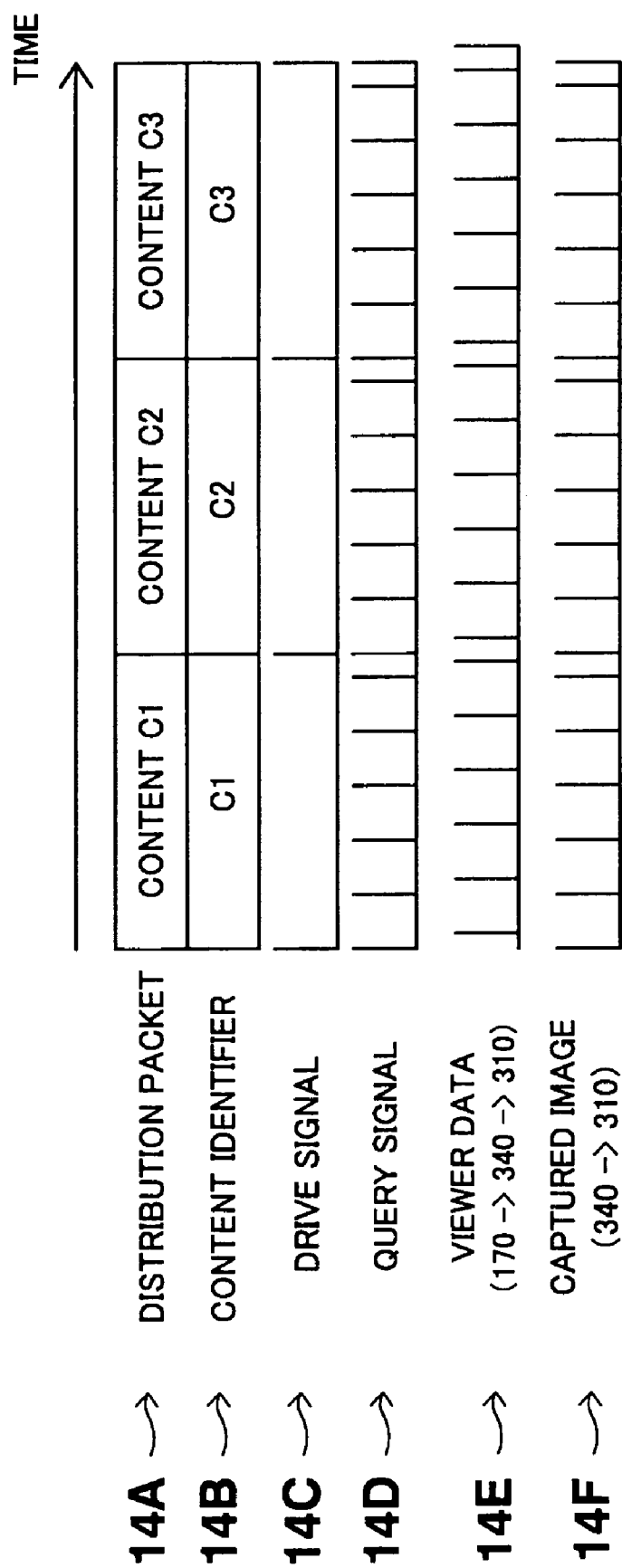
FIG. 14 presents an example of timing with which signals may be exchanged in the third embodiment.

FIG. 14 illustrates timing with which signals or information transmitted/received within the information processing system 300 in the embodiment may be exchanged.

FIG. 14 indicates that content C1, content C2 and content C3 are distributed in this order along the time axis from the information processing apparatus 310 to the viewing apparatus 340 (14A). In addition, the individual sets of content data distributed from the information processing apparatus 310 to the viewing apparatus 340 respectively contain content identifiers "C1", "C2" and "C3" (14B).

At the viewing apparatus 340 receiving the individual sets of content data, a drive signal is output each time the content reception unit 342 detects a time point at which a given content identifier changes to another content identifier (14C). In addition, in response to the drive signal input thereto, the driver unit 146 transmits a query signal cyclically (14D).

Upon receiving the query signal from the driver unit 146, the radio communication apparatus 170 transmits viewer data constituted with the user identifier stored in the radio communication apparatus, the content identifier included in the query signal and the like, as a response to the query signal (14E). The viewer data transmitted from the radio communication apparatus 170 are relayed via the viewing apparatus 340 and are passed on to the information processing apparatus 310.

In addition, the captured image obtained by capturing an image of the viewer is transmitted from the viewing apparatus 340 to the information processing apparatus 310 with timings similar to those with which the query signal is output from the driver unit 146 (14F).

At the information processing apparatus 310, the captured image is matched with the face image obtained in correspondence to the user identifier included in the viewer data and once a successful match is made, the viewership effect is analyzed based upon the viewer data.

In the third embodiment of the present invention described above in reference to FIGS. 11~14, viewer data originating from radio communication apparatuses 170 carried by viewers are collected in response to the query signal transmitted from the viewing apparatus 340 synchronously with the content reproduction/viewing timing. Among any number of sets of viewer data collected in this manner, only the data, in correspondence to each set of which a successful match was achieved for the image captured with the viewing apparatus 340 and a face image held at the information processing apparatus 310, are used for the viewership effect analysis. Through these measures, it is ensured that viewers with incorrect user data and viewers showing low interest, i.e., viewers turning away from the display device, are excluded from the viewership-effect analysis and, as a result, the viewership effect on an unspecified number of viewers can be measured with a higher level of accuracy.

It is to be noted that an explanation is given above in reference to the embodiment on an example in which the analyzing unit 316 of the information processing apparatus 310 matches the captured image with a viewer's face image. However, the face image matching function may be assumed in the viewing apparatus 340 instead of in the information processing apparatus 310. For instance, the face image data or data indicating face image characteristic quantities may be transferred from the analyzing unit 316 of the information processing apparatus 310 to the viewing apparatus 340 so as to enable the viewing apparatus 340 to match the captured image with the transferred face image data or the transferred data indicating face image characteristic quantities. In such a case, match results indicating either a successful match or a failed match are provided from the viewing apparatus 340 to the analyzing unit 316, which is then able to designate only viewers having passed the matching process as viewership effect analysis targets.

(4) Fourth Embodiment

Next, in reference to FIGS. 15~19, the fourth embodiment of the present invention is described.

Figure 15:
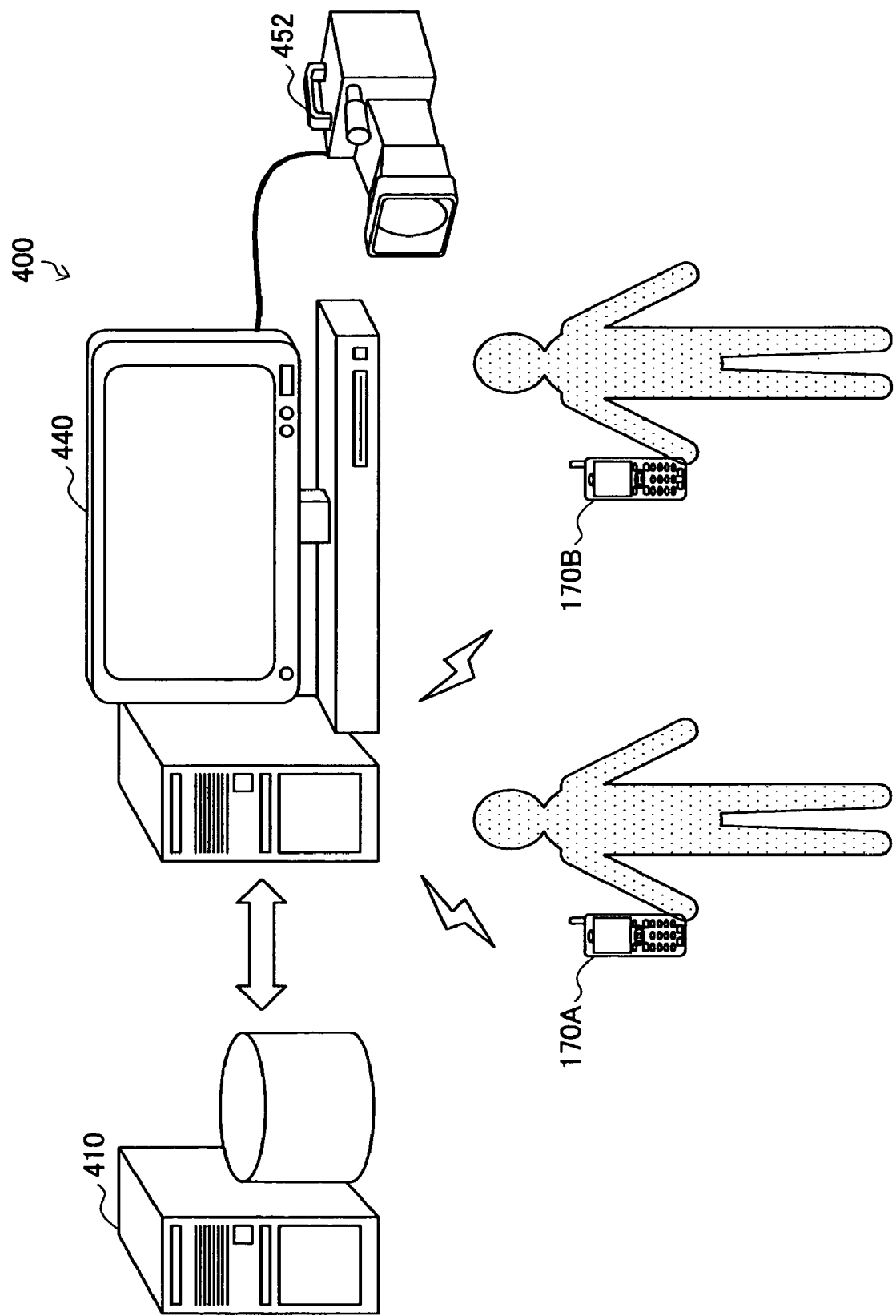
FIG. 15 schematically illustrates the configuration of the information processing system according to a fourth embodiment.

FIG. 15 schematically illustrates the configuration of an information processing system 400 according to the fourth embodiment of the present invention. The information processing system 400 in FIG. 15 includes an information processing apparatus 410, a viewing apparatus 440 and radio communication apparatuses 170. As in the third embodiment, the viewing apparatus 440 is equipped with an additional unit, i.e., an imaging unit 452.

While FIG. 15 shows a single viewing apparatus 440, the embodiment may be adopted in conjunction with a plurality of viewing apparatuses 440. In addition, any number of radio communication apparatuses 170 may be used in conjunction with a given viewing apparatus 440.

The viewing apparatus 440 in the embodiment may be installed at, for instance, a public facility, a retail store, in an office or a residential home. The display device of the viewing apparatus 440 may be, for instance, a large-screen television installed in a public space.

Figure 16:
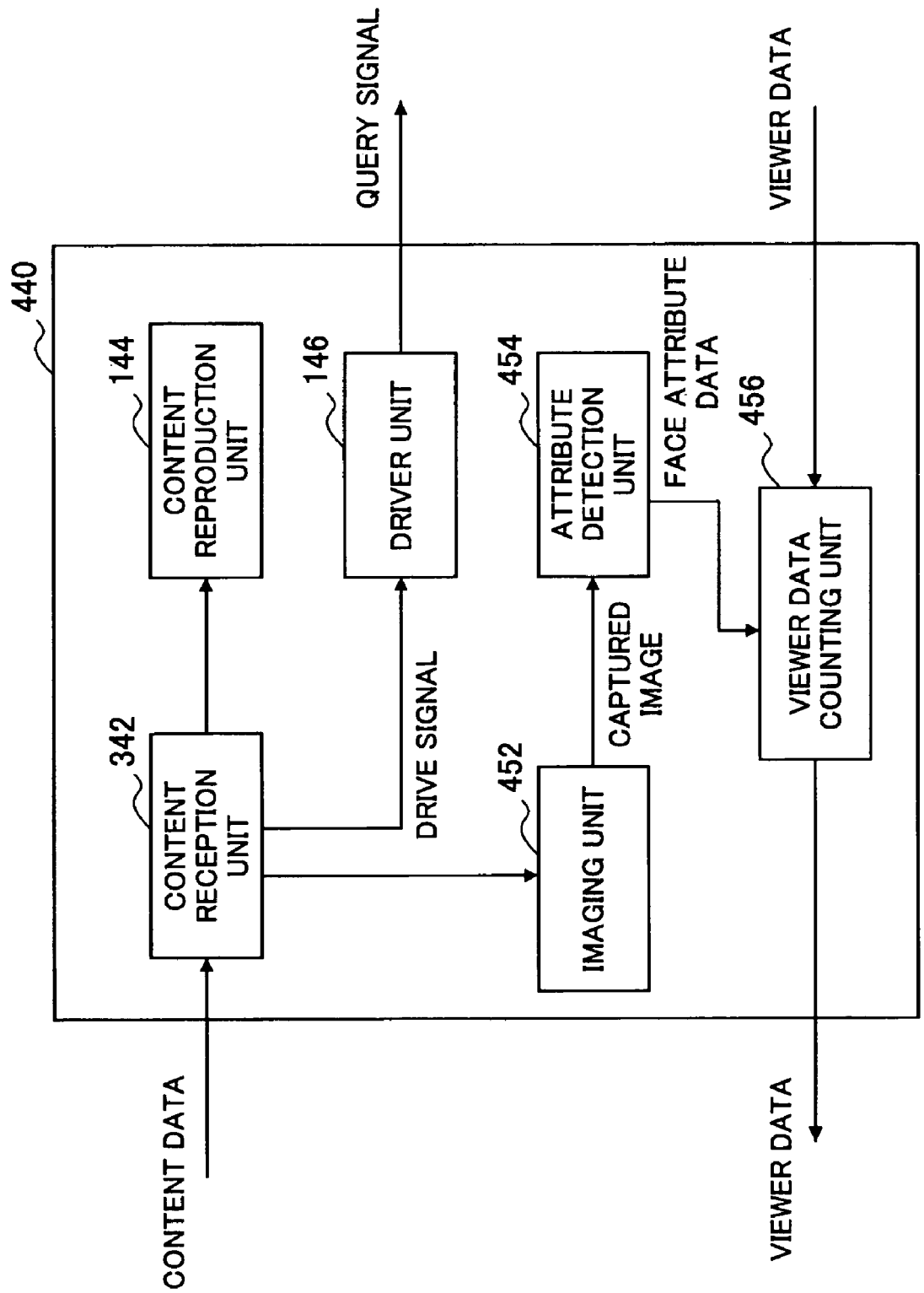
FIG. 16 is a block diagram showing the structure of the viewing apparatus according to the fourth embodiment.

FIG. 16 is a block diagram showing the logical structure adopted in the viewing apparatus 440 in the embodiment. As shown in FIG. 16, the viewing apparatus 440 includes a content reception unit 342, a content reproduction unit 144, a driver unit 146, the imaging unit 452, an attribute detection unit 454 and a viewer data counting unit 456.

The imaging unit 452 captures an image of the viewer with an imaging device disposed near the display device at which the content is reproduced and outputs the captured image to the attribute detection unit 454. The imaging operation may be executed continually by the imaging unit 452 while the content is reproduced via the content reproduction unit 144 over cycles matching the query signal output cycles with which the query signal is output from the driver unit 146.

The attribute detection unit 454 identifies a viewer's face area in the captured image input thereto from the imaging unit 452 and detects attributes of the viewer by extracting facial features characterizing the face included in the identified face area.

For instance, while advertising content is being reproduced by the content reproduction unit 144, a viewer interested in the content of the advertisement may move toward the display device and look towards the display device to view the content. Under such circumstances, the level of viewer interest may be estimated based upon the direction of his face and the level of viewer interest thus determined may be used as a viewer attribute.

In addition, the age group and the gender of each viewer may be used as a viewer attribute. For instance, one of eight viewer demographic groups (M1, M2, M3, F1, F2, F3, kids, teens) each defined by combining a specific viewer age group and a specific gender, used in television program ratings analysis, may be detected as an attribute of the viewer.

Figures 17A, 17B:
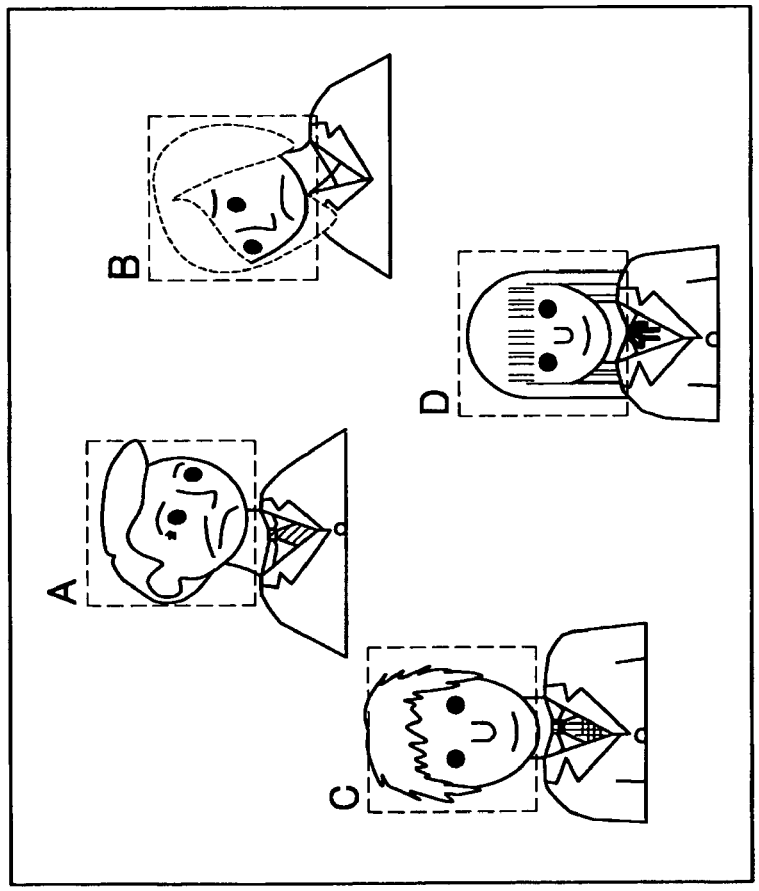
FIG. 17 illustrates an example of processing that may be executed by the attribute detection unit in the fourth embodiment.

FIGS. 17A and 17B illustrate the viewer attribute detection processing executed by the attribute detection unit 454 in the embodiment in more specific detail.

FIG. 17A shows an image captured via the imaging unit 452 while content is being reproduced by the content reproduction unit 144. Four viewers appear in the captured image shown in FIG. 17A. FIG. 17B presents a table indicating the direction of the face in each face area, estimated based upon the captured image in FIG. 17A and the corresponding attribute values having been detected.

As the captured image shown in FIG. 17A is input, the attribute detection unit 454 first identifies face areas corresponding to the viewers appearing in the captured image. The face areas may be identified through, for instance, a method disclosed in Japanese Laid Open Patent Publication No. 2007-94633, which is adopted in practical applications in digital cameras and the like. In the example presented in FIG. 17A, four face areas A, B, C and D are identified in the captured image.

Once the face areas have been identified, the attribute detection unit 454 detects attribute values corresponding to the viewer in each face area through matching processing executed by using reference images each indicating a predefined attribute such as face direction, age group or gender. Any pattern recognition method in the related art may be adopted in the matching processing executed by using such reference images.

FIG. 17B indicates that the direction of the face in the face area A is estimated to be right 45°/down 45° with the corresponding interest level at 0.5. In addition, the demographic group to which the viewer in the face area A belongs is judged to be M3 (male, over 50) based upon the results of the reference image matching processing. Likewise, the direction of the face in the face area B is estimated to be left 45°/down 45° with the corresponding interest level at 0.5. The demographic group to which the viewer in the face area B belongs is judged to be F1 (female, 20~34). In contrast, the faces in the face areas C and D are judged to be turned frontward and the corresponding interest levels are both 1 indicating focused viewing. The demographic group to which the viewer in the face area C belongs is judged to be M1 (male, 20~34), whereas the demographic group to which the viewer in the face area D belongs is judged to be "teen" (male/female, 13~19).

The attribute detection unit 454 outputs the viewer attribute values detected from the captured image as described above to the viewer data counting unit 456, where they are used as face attribute data.

The viewer data counting unit 456 tabulates the face attribute data output from the attribute detection unit 454, incorporates them into the viewer data transmitted from the radio communication apparatus 170 and transmits the integrated data to the information processing apparatus 410.

FIG. 18 presents an example of face attribute data tabulation processing that may be executed by the viewer data counting unit 456. The numbers of viewers corresponding to the individual demographic groups are indicated on the left half of the table presented in FIG. 18, whereas the numbers of focused viewers demonstrating high levels of interest in the content are indicated in correspondence to the individual demographic groups on the right half of the table.

FIG. 18 indicates that the content reproduced in the time slot 11 to 12 (11~12) was viewed by one "M1" viewer, one "M3" viewer, one "F1" viewer and one "teen" viewer but was not viewed by any viewers in the other demographic groups. In addition, while the "M1" viewer and the "teen" viewer were judged to be focused viewers, no viewers in the other demographic groups were determined to be focused viewers. The total number of viewers corresponds to the number of face areas detected in, for instance, the captured image shown in FIG. 17. In addition, the number of focused viewers corresponds to the number of face areas with faces therein turned toward the front, indicating an interest level of 1, among the face areas detected in the captured image shown in FIG. 17.

The viewer data counting unit 456 transmits viewer data that include the numbers of viewers and the numbers of focused viewers corresponding to the individual demographic groups having been tabulated as described above, to the information processing apparatus 410. However, it is not essential that the viewer data be transmitted from the radio communication apparatus 170 in the embodiment. In other words, the viewer data counting unit 456 may transmit to the information processing apparatus 410 viewer data constituted with just the numbers of viewers and the numbers of focused viewers corresponding to the individual demographic groups having been tabulated as shown in FIG. 18, together with the content identifier.

FIG. 19 is a block diagram showing the logical structure of the information processing apparatus 410 according to the embodiment. As shown in FIG. 19, the information processing apparatus 410 includes a content container unit 112, a content distribution unit 114, an analyzing unit 416 and a content selection unit 118.

Upon receiving the viewer data described earlier from the viewing apparatus 440, the analyzing unit 416 analyzes the viewership effect of the content reproduced by the viewing apparatus 440 based upon the received viewer data. For instance, the analyzing unit 416 may tabulate the numbers of viewers and the numbers of focused viewers corresponding to the individual demographic groups indicated in viewer data received from a plurality of viewing apparatuses 440 and analyze the viewership effect on the viewers in each demographic group. The analysis results obtained at the analyzing unit 416 are then output to the content selection unit 118 and an external system (not shown).

Based upon the analysis results provided by the analyzing unit 416, the content selection unit 118 may subsequently select optimal content or the external system (not shown) may allocate an appropriate advertising budget or formulate the optimal advertising strategy. For instance, if the analysis results indicate that teenage viewers demonstrated the highest level of interest, the content selection unit 118 may select advertisement content targeted for teenagers to be distributed to the viewing apparatus 440 and issue an instruction for the content distribution unit 114 accordingly.

In the fourth embodiment of the present invention having been described in reference to FIGS. 15~19, the level of viewer interest in the content and attributes of each viewer, e.g., the age group and the gender, are detected in an image generated by capturing viewers and viewer data tabulated based upon the detected attributes are collected. Through these measures, the viewership effect can be measured by taking into consideration varying levels of active interest in viewing the content, demonstrated by any unspecified number of viewers, making it possible to provide an even more effective content distribution service. In addition, since the user attribute data do not need to be transmitted from radio communication apparatuses 170 in the present embodiment, the risk of information leak occurring as information is gathered for purposes of viewership effect measurement is reduced.

It is to be noted that while an explanation is given above in reference to the embodiment on an example in which the level of interest, estimated based upon the direction of each viewer's face, and the age group and gender of the viewer is detected, only some of such viewer attributes may be detected. For instance, the level of interest can be estimated based only upon the direction of the viewer's face may be detected and in such a case, the value of the content transcends gender differences or generational preferences. As an alternative, only the age group and the gender of each viewer may be detected so as to determine the popularity of a given set of content in correspondence to each demographic group.

In addition, the fourth embodiment may be adopted in combination with the third embodiment. Namely, the face image data and the attribute data of each user may be saved by correlating them in advance and the attributes of a given viewer may be ascertained by matching a face area identified in the captured image with a stored face image so as to eliminate the need for detecting the age group and gender via the attribute detection unit 454.

(5) Other variations

An explanation has been given above in reference to the four embodiments on an example in which viewer data are transmitted from a radio communication apparatus held or carried by a viewer or an image of the viewer is captured by an imaging device installed at the viewing apparatus so as to enable viewership effect measurement based upon data indicating the attributes of an unspecified number of viewers. Information that may be included in such viewer data is not limited to the types of information described in reference to the embodiments and any type of information may be included in the viewer data, as long as it can be used effectively for viewership measurement.

For instance, while the content identifier and the content reproduction time point are included in the query signal in the first embodiment, the query signal may further include an identification code used to identify the content reproduction location. By including the identification code obtained from the query signal in the viewer data transmitted from the radio communication apparatus, the viewership effect can be measured in correspondence to each viewing location.

In addition, the query signal may include information indicating a specific type of user data to be included in the response (i.e., the viewer data to be transmitted from the radio communication apparatus) to the query signal. For instance, in the example presented in FIG. 6, as long as the user identifier, among the three types of user data indicating the user identifier, the age group and the gender, is collected, the viewership effect analysis is enabled. Under such circumstances, the query signal may specify only the user identifier to be included in the viewer data and the output of the other types of information may be restricted so as to better protect the viewer's privacy.

Furthermore, the query signal may include a response condition specifying an apparatus to respond to the query signal. The response condition may specify, for instance, a user attribute such as a specific age group or a specific gender. In such a case, the data transmitting unit will transmit the viewer data only if the particular radio communication apparatus satisfies the response condition included in the received query signal, i.e., only if the user data held at the particular radio communication apparatus satisfy the response condition. Through these measures, the viewership effect on specific target viewers can be measured. For instance, the viewership effect specifically on female viewers can be measured by setting a response condition requesting a response only from apparatuses belonging to female users.

Moreover, the sequences of processing executed in the first through fourth embodiments, as described above, may be realized using hardware or software. If a processing sequence is to be executed in hardware in part or in its entirety, a program constituting the software will be executed by a computer installed in dedicated hardware or by a general-purpose computer such as that shown in FIG. 20.

In FIG. 20, a CPU (central processing unit) 902 controls the overall operation executed in the general-purpose computer. A program describing the processing sequence in part or in its entirety and data are stored in a ROM (read-only memory) 904. The program, the data and the like used by the CPU 902 as it executes processing are temporarily stored into a RAM (random access memory) 906.

The CPU 902, the ROM 904 and the RAM 906 are connected with one another via a bus 908. An input/output interface 910 is also connected to the bus 908.

Via the input/output interface 910, the CPU 902, the ROM 904 and the RAM 906 achieve connections with an input device 912, an output device 914, a storage device 916, a communication device 918 and a drive 920.

The input device 912 takes in instructions and information entered by the user via an input member such as a button, a switch, a lever, a mouse or a keyboard. The output device 914 outputs information to the user via a display device such as a CRT (cathode ray tube), a liquid crystal display unit, an OLED (organic light emitting diode), or via an audio output device such as a speaker.

In the storage device 916, which may be constituted with a hard disk drive or a flash memory, programs, program data, content data, user data or the like are stored. The communication device 918 is engaged in communication processing via a network such as a LAN or the Internet. At the drive 920, which is installed as necessary in the general-purpose computer, a removable medium 922, for instance, may be loaded.

When executing the processing sequences in the first through fourth embodiments in software, the programs stored in the ROM 904, the storage device 916 or the removable medium 922 in FIG. 20 are read into the RAM 906 at the time of execution and are executed by the CPU 902.

As described above, preferred embodiments of the present invention have been described with reference to the accompanying drawings, however, it goes without saying that the present invention is not limited to such embodiments. It is to be clearly conceived to those skilled in the art that the present invention can be applicable to various changed and modified embodiments within the scope of the present invention as set forth in the appended claims and it is to be naturally understood that those changed and modified embodiments also ascribe within the scope of technical idea of the present invention.

For instance, while an explanation is given above in reference to first through fourth embodiments by assuming that the information processing apparatus and the viewing apparatus are separate entities connected via a communication network, the present invention may be adopted in conjunction with an integrated apparatus constituted with the information processing apparatus and the viewing apparatus.

What is claimed is:

1. An information processing system, comprising:
 a viewing apparatus equipped with a content reproduction unit that reproduces content containing video data or audio data;
 a radio communication apparatus equipped with a storage unit in which user data correlated to a user to whom said radio communication apparatus belongs are stored and a data transmitting unit that transmits viewer data that include part of or all of said user data stored in said storage unit; and an information processing apparatus equipped with an analyzing unit that analyzes, based upon the user data, a viewership effect of the content reproduced by said viewing apparatus and a content distribution unit that distributes content data to be used to reproduce the content to said viewing apparatus.

2. An information processing system according to claim 1, wherein:

said viewing apparatus is further equipped with a driver unit that prompts said radio communication apparatus to transmit said viewer data by transmitting a query signal containing a content identifier to be used to identify the content;

said radio communication apparatus is further equipped with a radio communication unit that receives said query signal from said viewing apparatus; and said data transmitting unit transmits said viewer data that include said content identifier contained in said query signal received at said radio communication unit and part of or all of said user data stored in said storage unit.

3. An information processing system according to claim 2, wherein:

said data transmitting unit stores said content identifier contained in said query signal received at said radio communication unit temporarily into a recording medium and transmits said viewer data that include the saved content identifier and part of or all of said user data stored in said storage unit after a request signal requesting transmission of said viewer data is input thereto.

4. An information processing system according to claim 2, wherein:

said driver unit obtains a content identifier included in said content data distributed from said content distribution unit of said information processing apparatus and generates said query signal, which contains said content identifier.

5. An information processing system according to claim 2, wherein:

said query signal includes information that specifies at least one of; a content reproduction time point, a reproduction location, content details, a response condition indicating an apparatus to respond to said query signal and a type of data to be included in a response to said query signal.

6. An information processing system according to claim 5, wherein:

said data transmitting unit transmits said viewer data only if said radio communication apparatus satisfies a response condition, provided that said signal includes information specifying said response condition indicating an apparatus to respond to said query signal.

7. An information processing system according to claim 1, wherein:

said data transmitting unit continually transmits said viewer data over regular cycles.

8. An information processing system according to claim 1, wherein:

said viewer data includes a user identifier used to identify the user;

said information processing apparatus is further equipped with a user data container unit that holds attribute data corresponding to each user in relation to said user identifier; and said analyzing unit extracts said user identifier from said viewer data and analyzes the viewership effect of the content by obtaining from said user data container unit said attribute data correlated to the extracted user identifier.

9. An information processing system according to claim 1, wherein:

said viewer data includes a user identifier used to identify the user;

said viewing apparatus is further equipped with an imaging unit that captures an image of a viewer of the content reproduced by said content reproduction unit;

said information processing apparatus is further equipped with a face image container unit that holds face image data corresponding to each user in relation to said user identifier; and said analyzing unit extracts said user identifier from said viewer data and analyzes the viewership effect of the content based upon said viewer data only if a face image related to the extracted user identifier has a match in the image captured by said imaging unit.

10. An information processing system according to claim 1, wherein:

said viewing apparatus is further equipped with an imaging unit that captures an image of a viewer of the content reproduced by said content reproduction unit; and said analyzing unit analyzes the viewership effect of the content in reference to an interest level index indicating a person's level of interest in the content, determined based upon the direction of the person's face in the image captured by said imaging unit.

11. An information processing system according to claim 1, wherein:

said viewing apparatus is further equipped with an imaging unit that captures an image of a viewer of the content reproduced by said content reproduction unit; and said analyzing unit analyzes the viewership effect of the content in reference to attribute data indicating a gender and/or an age group of a person in the image captured by said imaging unit, determined based upon the captured image.

12. An information processing system according to claim 10, wherein:

said information processing apparatus is further equipped with a face image data container unit that holds face image data corresponding to each user in relation to said attribute data; and said analyzing unit analyzes the viewership effect of the content in reference to said attribute data of a person identified by matching a face area of the person in the image captured by said imaging unit with face image data held in said face image data container unit.

13. An information processing system according to claim 1, wherein:

said information processing apparatus is further equipped with a content selection unit that selects content to be distributed via said content distribution unit in correspondence to results of viewership effect analysis executed by said analyzing unit.

14. A viewership effect measuring method, comprising steps of:

distributing content data to be used to reproduce content containing video data or audio data to a viewing apparatus from an information processing apparatus;

receiving and reproducing said content data at said viewing apparatus;

transmitting viewer data that includes part of or all of user data correlated to a viewer of the reproduced content from a radio communication apparatus belonging to the viewer; and receiving said viewer data at said information processing apparatus and analyzing a viewership effect of the content reproduced by said viewing apparatus based upon said viewer data having been received.

* * * * *